(12) United States Patent
Drewry et al.

(10) Patent No.: US 7,797,418 B2
(45) Date of Patent: Sep. 14, 2010

(54) METHOD OF MAINTAINING BROADCAST DATA STREAM

(75) Inventors: Raymond Drewry, Woodside, CA (US); Mark Vickers, Belmont, CA (US); Brian Bulkowski, Berkeley, CA (US); Weidong Mao, West Windsor, NJ (US); David M. Leonard, West Chester, PA (US)

(73) Assignee: TVWorks, LLC, Philadelphia, PA (US)

( * ) Notice: Subject to any disclaimer, the term of this patent is extended or adjusted under 35 U.S.C. 154(b) by 1249 days.

(21) Appl. No.: 10/213,487

(22) Filed: Aug. 6, 2002

(65) Prior Publication Data

US 2004/0030760 A1 Feb. 12, 2004

(51) Int. Cl.
*G06F 15/173* (2006.01)
*G06F 15/16* (2006.01)

(52) U.S. Cl. .................. 709/224; 709/223; 709/231

(58) Field of Classification Search ......... 709/223–224, 709/231; 725/2, 32, 36, 93, 115, 116, 136
See application file for complete search history.

(56) References Cited

U.S. PATENT DOCUMENTS

| | | | | |
|---|---|---|---|---|
| 6,088,722 A * | 7/2000 | Herz et al. | ................... | 709/217 |
| 6,189,033 B1 * | 2/2001 | Jin et al. | ..................... | 709/225 |
| 6,441,832 B1 * | 8/2002 | Tao et al. | ..................... | 715/723 |
| 6,782,550 B1 * | 8/2004 | Cao | ............................. | 725/39 |
| 7,076,544 B2 * | 7/2006 | Katz et al. | ................... | 709/223 |
| 7,216,149 B1 * | 5/2007 | Briscoe et al. | ............. | 709/217 |
| 2002/0144260 A1 * | 10/2002 | Devara | ........................ | 725/32 |
| 2002/0184333 A1 * | 12/2002 | Appelman | .................. | 709/217 |
| 2003/0018966 A1 * | 1/2003 | Cook et al. | ..................... | 725/2 |
| 2003/0028893 A1 * | 2/2003 | Addington | .................. | 725/115 |
| 2004/0073867 A1 * | 4/2004 | Kausik et al. | ............... | 715/500 |

* cited by examiner

*Primary Examiner*—Hussein Elchanti
(74) *Attorney, Agent, or Firm*—Banner & Witcoff, Ltd.

(57) ABSTRACT

Methods, apparatus, and network oriented systems are discussed for estimating system, e.g. web site, usage removed from the web site, as well as scheduling and directing a data broadcast source to provide content based on web site usage estimates and predictions in a broadcast data stream.

5 Claims, 25 Drawing Sheets

METHOD OF MAINTAINING BROADCAST DATA STREAM

TECHNICAL FIELD

This invention relates to detection and prediction of usage, such as web site hits by nodes in a network, and real-time scheduling of the addition and deletion of content into a broadcast data stream based upon usage statistics.

BACKGROUND ART

Two-way communication networks typically employ a transactional communication protocol. Under such a protocol, one connects to something, makes a request, and one receives a response. TCP/IP, SQL, and http all use this principle. Even file access across networks is based upon this principle. Two-way networks face some fundamental problems, among them, how a content source responds to a sudden increase, known hereafter as a spike, in requests to that source. One drawback of the standard approaches to solving this problem is that they render the content source inoperable when the requests pass the content source's response limits.

The development and deployment of residential broadband systems has enabled millions of users to receive hundreds of television channels. Thus, there are known successful merges of at least partial two-way communications and residential broadband delivery, such as the Advanced Television Enhancement Forum (ATVEF).

All of these systems and network solutions face a central problem when the two-way communications networks overload from spikes in use. Broadcast content providers lose the use of their web sites when they are most needed. The two-way networks are often clogged with redundant transfers which are better done through a broadcast mechanism.

Additionally, there are problems in determining when these usage spikes occur. The web site being overloaded is in a poor position to call for help and the prior art does not provide an external mechanism to determine web site hits.

One approach to determining when usage spikes would occur involves the use of packet analysis. However, known applications of packet analysis are invasive of either privacy or traffic flow. The router/bridge/firewall applications often alter not only the packets themselves but control how and where they are, or are not, permitted to be sent. Surveillance of network packet traffic can possibly violate the privacy of those communicating on the network.

Another problem with the state of the art is that two-way communication networks are inherently unreliable because access to any content source and/or broadcast data source can fail from too many access requests. This is a major problem to many content providers. Companies paying for advertising seen by millions of people during peak coverage events, such as sporting events, lose an expensive opportunity. Exactly when the most people are interested in finding out about a product or company, their web-site goes down.

Network nodes, e.g. can also fail for basically the same sort of reasons. Consider what happens if a large number of clients simultaneously try to multiple receive streaming video web sites. The nodes involved are likely to fail for essentially the same reason.

What is needed is a method and/or apparatus for improving a network's ability to withstand concentrated spikes, for example, of web-site hits in the two-way communications part of such networks.

SUMMARY OF THE INVENTION

The invention comprises a method and apparatus for usage estimation and prediction in two-way communications networks.

One embodiment of the invention which concerns a network, such as the Internet, and web sited associated therewith, the system first broadcasts a URL broadcast list containing the broadcast URL's and the broadcast source address, from the broadcast source address to clients. The client examines the URL broadcast list for the desired URL, and if it belongs to the URL broadcast list, connects to the broadcast source address to receive the combined content of the URL's. Otherwise, if the desired URL does not belong to the URL broadcast list, the client can use a two-way communications protocol to access the desired URL, subject to the traffic constraints of the employed two-way communications mechanism.

The client may request a URL which may or may not be broadcast, or is soon to be broadcast, and the herein disclosed technique resolves where to direct the client to receive either the broadcast URL content, or if supported, where to receive the requested URL via two-way communications.

The invention also provides a technique for determining when rapid increases in web site hits occur, for transferring such web site content for broadcast content inclusion, and for directing the recipient sites that request that web site to that broadcast content.

The invention also provides a technique for using a broadcast delivery system, based upon interactions with a two-way communications network as follows: A client accesses a two-way network address to receive broadcast delivery directions. The client accesses the broadcast delivery system based upon the broadcast delivery directions for reception of the two-way network address content.

The preferred embodiment of the invention uses a naming system that provides content developers with a unified approach to specifying content to be delivered in either the two-way communications paradigm or in the broadcast delivery paradigm. This creates deliverable content for either broadcast communication and/or two-way communications without having to be concerned with its specific delivery vehicle.

The invention also provides a technique for deciding when to place content into a broadcast stream provided by a broadcast data stream server.

The invention also provides a technique for determining high concentrations of web site hits in near real-time.

The invention also provides a technique that examines, for at least one node in a network, recent past web site hits to calculate the list of most hit web sites in the recent past. The node reports those recently hit web sites that pass pre-established concentration criteria. Note that in certain situations, it is preferred to examine web site hits for clients at every node. In other situations, the examining is only done at a subset of the nodes. Also, it may be preferred to examine activity for all clients, or a subset of the clients of a node.

The examining nodes may use a number of differing mechanisms to determine web sites to report. The examining node may report web sites receiving more than a certain number of hits in a recent time period. The recent time period may be on the order of a fraction of a second or more. The examining node may report web sites whose hit statistics indicate usage spikes. Hit statistics for a web site may include, but are not limited to, the number of hits in each of several consecutive or almost consecutive time periods. Various mechanisms to determine usage spikes include, but are not limited to, curve fitting, finite differencing, and interpolating to a selected wavelet base.

One or more higher nodes may be selected from the collection of nodes, as well as entities incorporated into or closely associated with a broadcast data source. In certain cases, these nodes have similar structure and responsibilities. The selection process for nodes examining client communications may use a randomizing mechanism. Alternatively, the selection process may use a decision mechanism.

The higher nodes integrate at least some of the examining node reports to form at least one new broadcast web site target communicated to the broadcast data source when the situation is warranted. By selecting a fixed number of higher nodes, the system bandwidth to signal the next broadcast web site targets can be constrained to meet the bandwidth service requirements of the broadcast data source as well as support task overhead constraints within the broadcast data source.

DETAILED DESCRIPTION OF THE INVENTION

The following discussion and FIGS. 1A-2C describe known two-way network systems and methods.

Figure 1A:
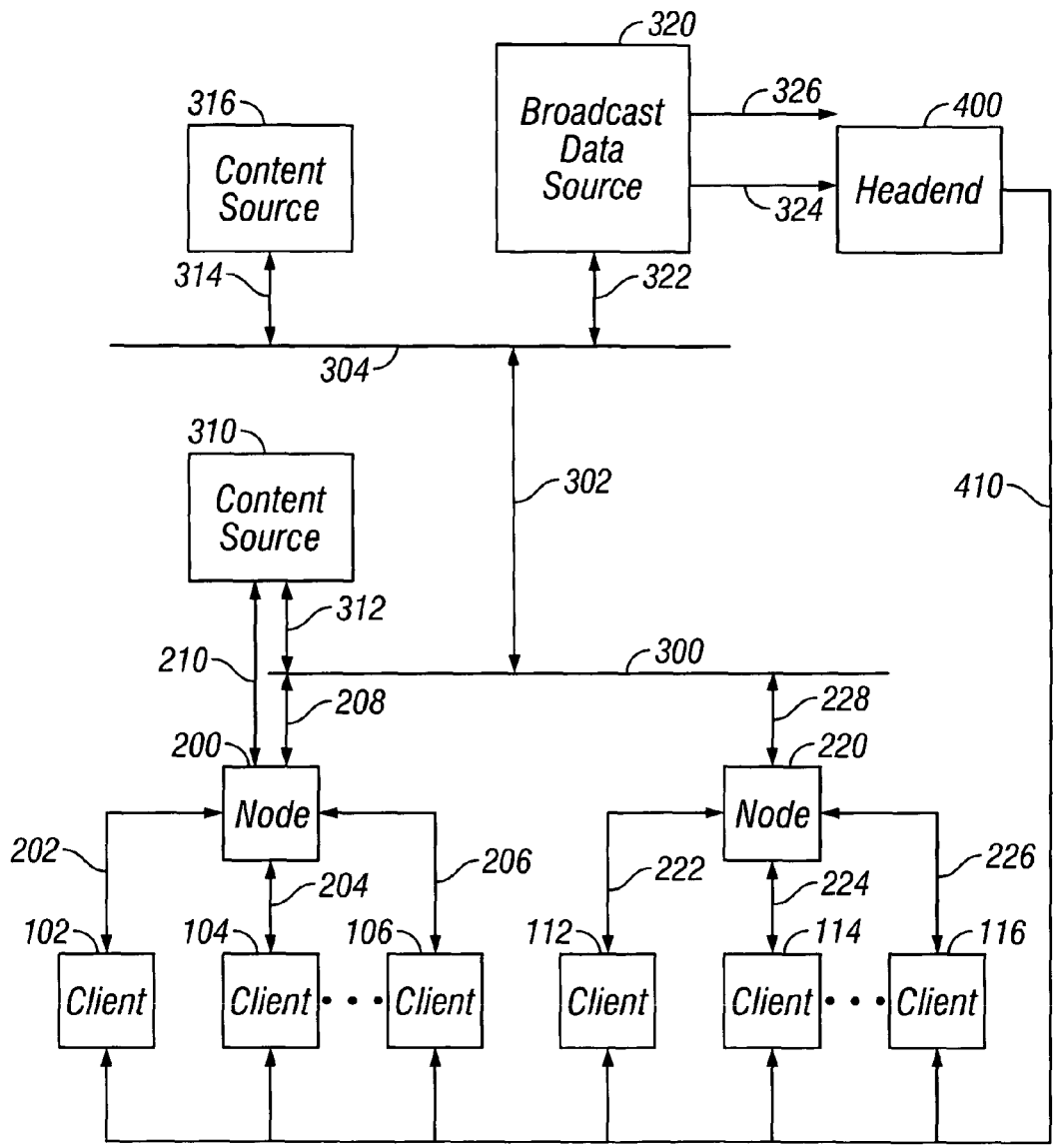
FIG. 1A depicts a simplified network system diagram of the prior art from the perspective of two-way communications.

FIG. 1A depicts a simplified network system diagram of the prior art from the perspective of two-way communications.

Two-way networks 300 usually contain a collection of nodes 200 and 220 coupled to network 300 via couplings 208 and 228. Each node 200, 220 provides a concentrated point of service for collections of several hundred to several thousand clients, each of which is coupled by some form of network connection to the service providing node. Note that the network connection or coupling may involve at least one wireline and/or wireless physical transport.

By way of example, node 200 may be a proxy server coupled by couplings 202, 204, and 206 to clients 102, 104 and 106, respectively. By way of example, node 220 may be a packet analyzer coupled by 222, 224, and 226 to clients 112, 114, and 116. In most ways, the clients are unaware of the nodes, which often act as proxy servers and/or packet analyzers.

As used herein, packet analyzers include, but are not limited to, routers, firewalls and bridges which interrogate each packet they receive to determine whether they are destined for transmission on a different network than the one on which they were received or to diagnose network traffic problems.

Two-way network 300 may couple couplings 302-304, 314-322 through a variety of mechanisms, for example, a global telecommunications network, e.g. the Internet, to a broadcast data source 320 which provides at least one broadcast data stream 324 to the clients of multiple nodes 200 and 220, as shown in the FIG. 1A.

Two-way communications protocols such as http (IETF or W3C) are based upon a request followed by a system response. Suppose that delivery of a web page is desired. A request for that web page is made, the request is processed, and the web page is delivered.

In terms of known two-way communications schemes, when client 102 requests a connection to content source 310 (or any other of several content source, e.g. content source, 316), node 200 forwards the request via coupling 208 across network 300 through coupling 312 to content source 310. Content source 310, if it can, sends a response to client 102 via coupling 312 across network 300 via coupling 208 through node 200 via coupling 202. Node 200 establishes connection 210, which then provides a two-way communication connection 210-200-202 with client 102.

Broadcast data source 320 generates at least one, and in FIG. 1A two, broadcast data streams 324 and 326, of which broadcast data stream 324 is fed to headend 400, to be integrated into broadband delivery stream 410, which is transported to nodes 200 and 220.

Figure 1B:
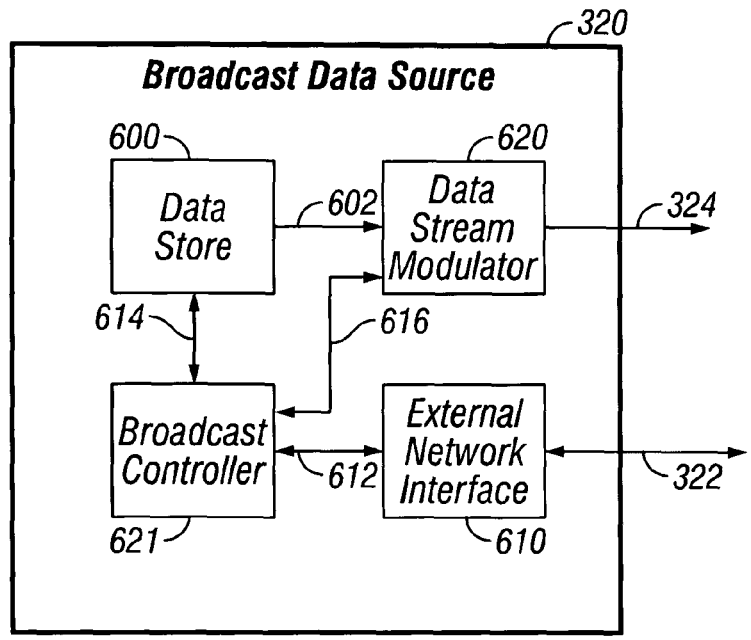
FIG. 1B depicts a broadcast data source of FIG. 1A.

FIG. 1B depicts a broadcast data source 320 of FIG. 1A of the prior art.

In contemporary systems, broadcast data stream 324 uses a television channel with a 6 MHz (or 8 MHz) frequency band within the broadband delivery signal, upon which the digital broadcast data stream 602 is coded and modulated, often using a Quadrature Amplitude Modulation QAM-64 scheme. This scheme provides about 27-28 Megabits per second in bandwidth for the broadcast data stream 324. Data stream modulator 620 converts digital broadcast data stream 602 e.g. from data store 600 into broadcast data stream 324 under control 616 of broadcast controller 621. Broadcast controller 621 also supervises operation of data store 600 via connection 614 and external network interface 610 via connection 612. Network access is via coupling 322 to external network interface 610.

Note that the integration of broadcast data stream 324 into broadband delivery signal 410 often involves frequency conversion and multiplexing which, in the illustrative figures of the document, are performed by headend 400.

Broadcast data source 320 may generate additional broadcast data streams 326 as shown in FIG. 1A among others.

Figure 2B:
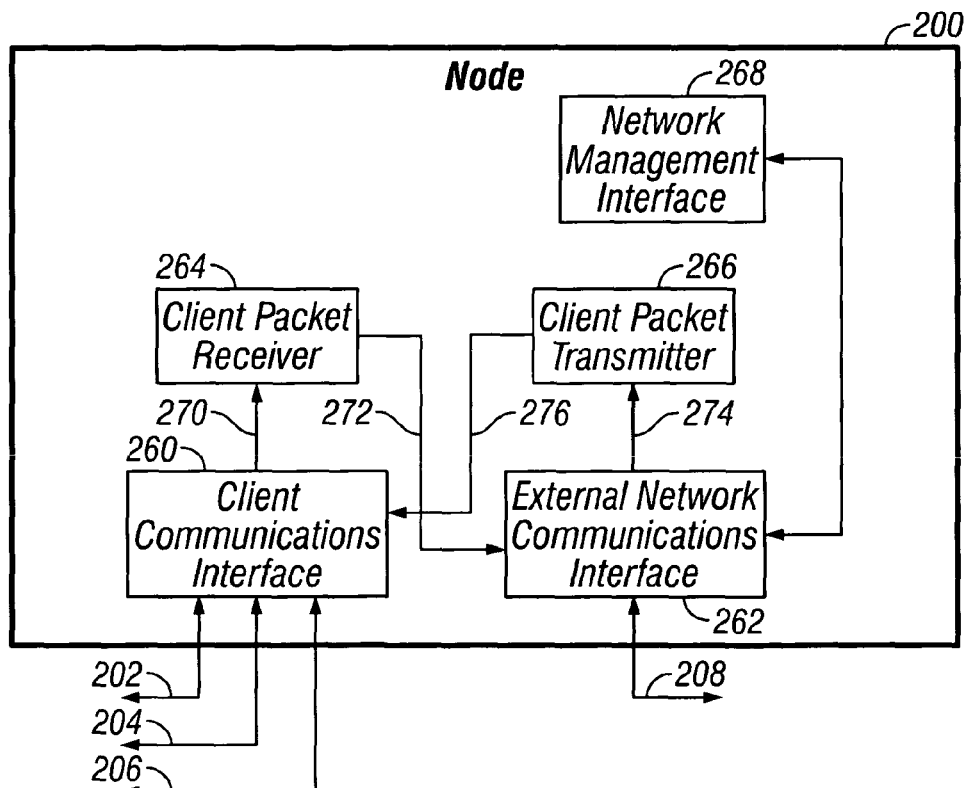
FIG. 2B depicts a simplified block diagram of node as found in FIGS. 1A and 2A.
Figure 2A:
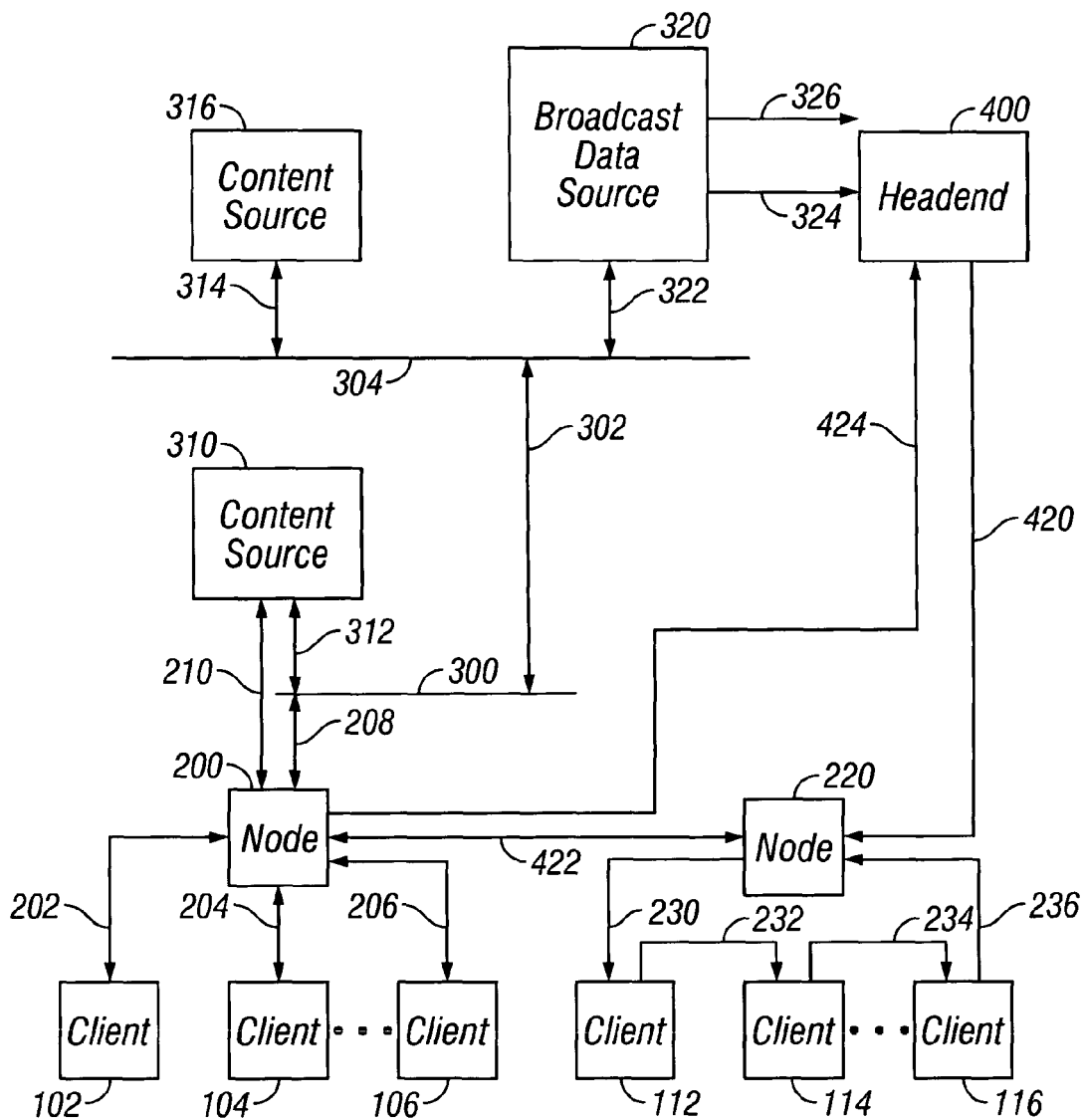
FIG. 2A depicts a comparable network to that shown in FIG. 1 from the perspective of a residential broadband delivery network based upon local loops.

FIG. 2A depicts a comparable network to that shown in FIG. 1*a* from the perspective of a residential broadband delivery network based upon local loops.

By way of example, assume that node 220 and clients 112, 114, and 116 belong to a local loop residential broadband distribution network. Node 220 and clients 112, 114, and 116 communicate through loop 230, 232, 234 and 236. Usually broadcast data source 320 feeds a headend 400 in such a network. The headend provides the broadcast data stream as part of the broadband delivery signal sent to node 200.

The communication between node 220 and clients 112, 114, and 116 includes a back channel component from the clients to node 220, usually of less than one megabit per second. The forward channel component from node 220 to the clients may be a second television channel coded, modulated, frequency converted, and multiplexed into the broadband delivery signal at node 220 before being sent to the clients.

Note that couplings 202, 204, and 206 are shown in a schematic fashion. Each of these coupling may be implemented by the same or different physical transports and communications protocols. By way of example, couplings 202, 204, and 206 may embody at least part of a residential local loop, which may use either copper, coaxial cable, and/or fiber optic physical transports.

As another example, couplings 202, 204, and 206 may embody wireless communications links. Node 200 may embody a wireless communications base station and provide connectivity to a wireline network 300.

In this example, node 220 is part of the television cable distribution process and often part of an integrated node-headend delivery service provider. Television is based upon a paradigm of continuous broadcast delivery without any regard to client loading. The continuous broadcast delivery paradigm has little or no tolerance for what is taken as a fact of life in two-way communications, that networks can go down and content sources disappear just because lots of clients respond to an advertisement or news story.

Node level service providers must design node 220 constrained by the fact that most of the time, the bandwidth and request traffic across the node is a fraction of the peak demands for bandwidth and request traffic. Simultaneously, they must provide a reasonable assurance both to content providers and clients that their network with headend 400 through nodes 220 services clients 112-116 within the continuous broadcast delivery paradigm. The cost of extending node 220 level facilities is a strong constraint, but the service paradigm requirement applies a strong pressure to extend node 220 level facilities.

FIG. 2B depicts a simplified block diagram of node 200 as found in FIGS. 1A and 2A of the prior art.

Client communications interface 260 services client couplings 202, 204 and 206, supporting a variety of distinct transport mechanisms including wireless and wireline physical transports. Packets received from clients are presented 270 to client packet receiver 264 and, when appropriate, are forwarded 272 to external network communications interface 262, which supports coupling 208 to network 300.

External network communications interface 262 receives packets which are forwarded 274 to client packet transmitter 266, which determines which of these packets should be sent to at least one client. The packets to be sent to the clients leave client packet transmitter 266 via coupling 276 for client communications interface 260 to send to the client destinations.

External network communications interface 262 also supports two-way communications with node 200's network management interface 268.

Network management interface 268 is shown coupled 278 with external network communications interface 262.

Figure 2C:
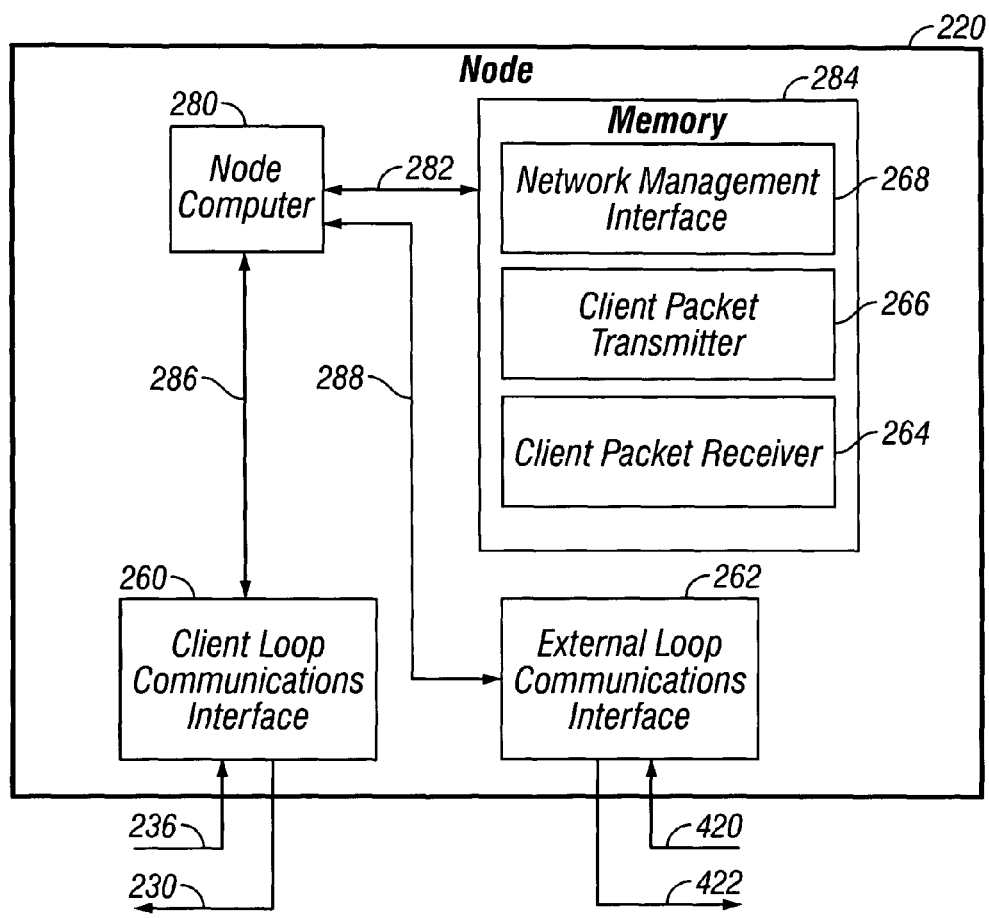
FIG. 2C depicts a simplified block diagram of node of FIG. 2A.

FIG. 2C depicts a simplified block diagram of node 220 of FIG. 2A including node computer 280 interacting with both interfaces 260 and 262.

In this approach, program steps residing in memory 284 accessibly coupled 282 with node computer 280 implement each of the client packet receiver 264, client packet transmitter 266 and network management interface 268.

These versions of a node block diagram as shown in FIGS. 2B-2C are provided for illustrative purposes. Numerous variations of these approaches can and are found in practice.

Figure 3A:
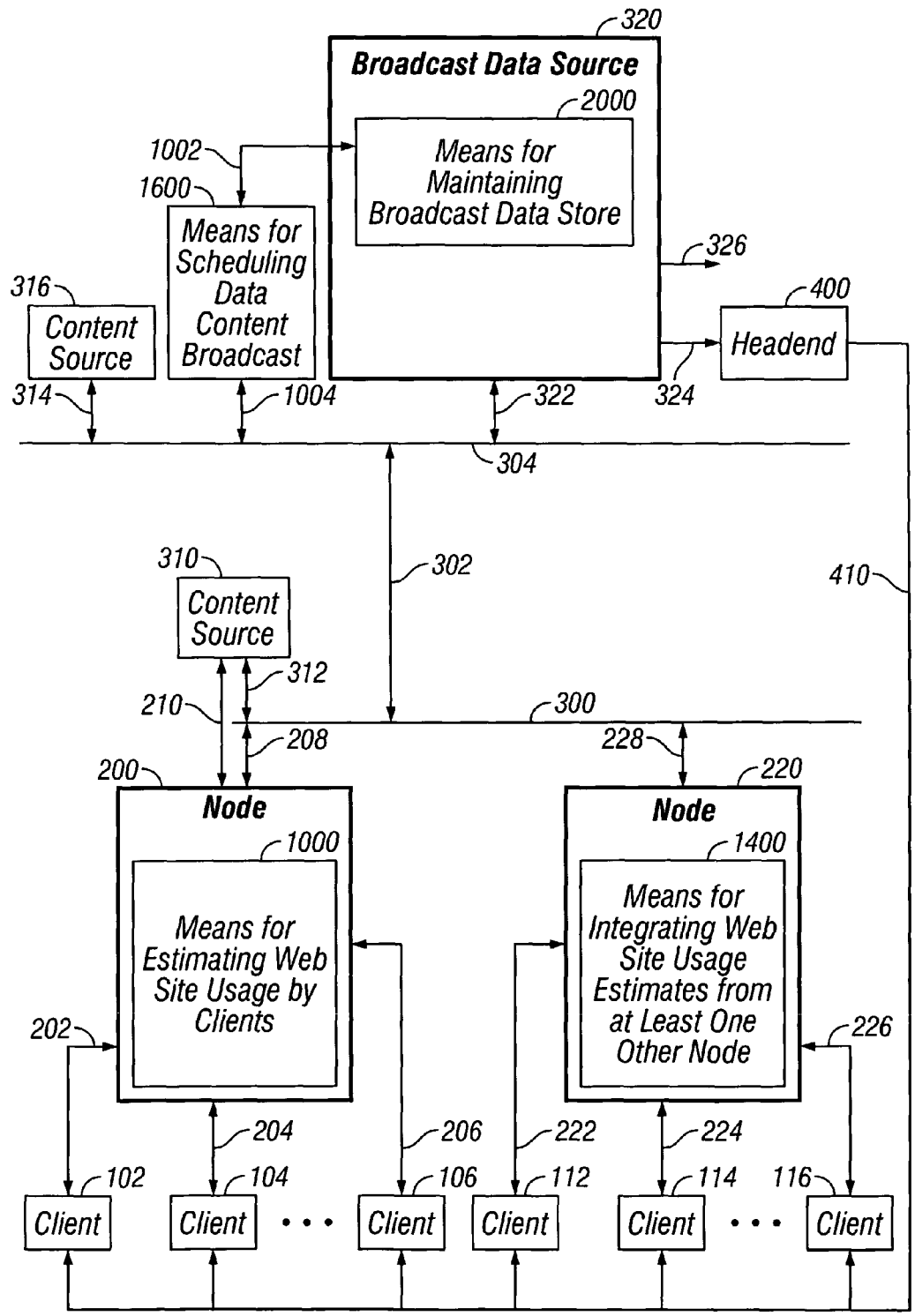
FIG. 3A depicts an exemplary embodiment of the invention that provides node level estimation of web-site usage as well as real-time scheduling of data content broadcast.

FIG. 3A depicts an exemplary embodiment of the invention that performs node level estimation of system usage such as, for example, web-site usage, as well as real-time scheduling of data content broadcast. While the discussion herein is concerned with web sites and web-based content, those skilled in the art will appreciate that the invention is readily applicable to other data and data sources. Further, because the exemplary embodiment of the invention disclosed herein is web-based, the preferred identification or location mechanism is described in terms of uniform resource locators (URL's). Those skilled in the art will appreciate that other identification and/or location schemes may be used in connection with the invention.

At least one node 200 includes a means for estimating web site usage by clients 1000. Means for scheduling data content broadcast 1600 presents 1002 data content from the web site for broadcast scheduling. Means for scheduling data content broadcast 1600 uses a usage estimate for at least one web-site to determine which data content should be scheduled. This is received by means 2000 controlling at least part of the broadcast data source 320. Note that broadcast scheduling includes at least one of adding content and removing content from the broadcast data stream 324.

Alternatively, node 200 may send its web-site usage estimates to node 220, where integrating web site usage estimates means 1400 may create a second web-site estimate, which is sent to scheduling means 1600.

Figure 3B:
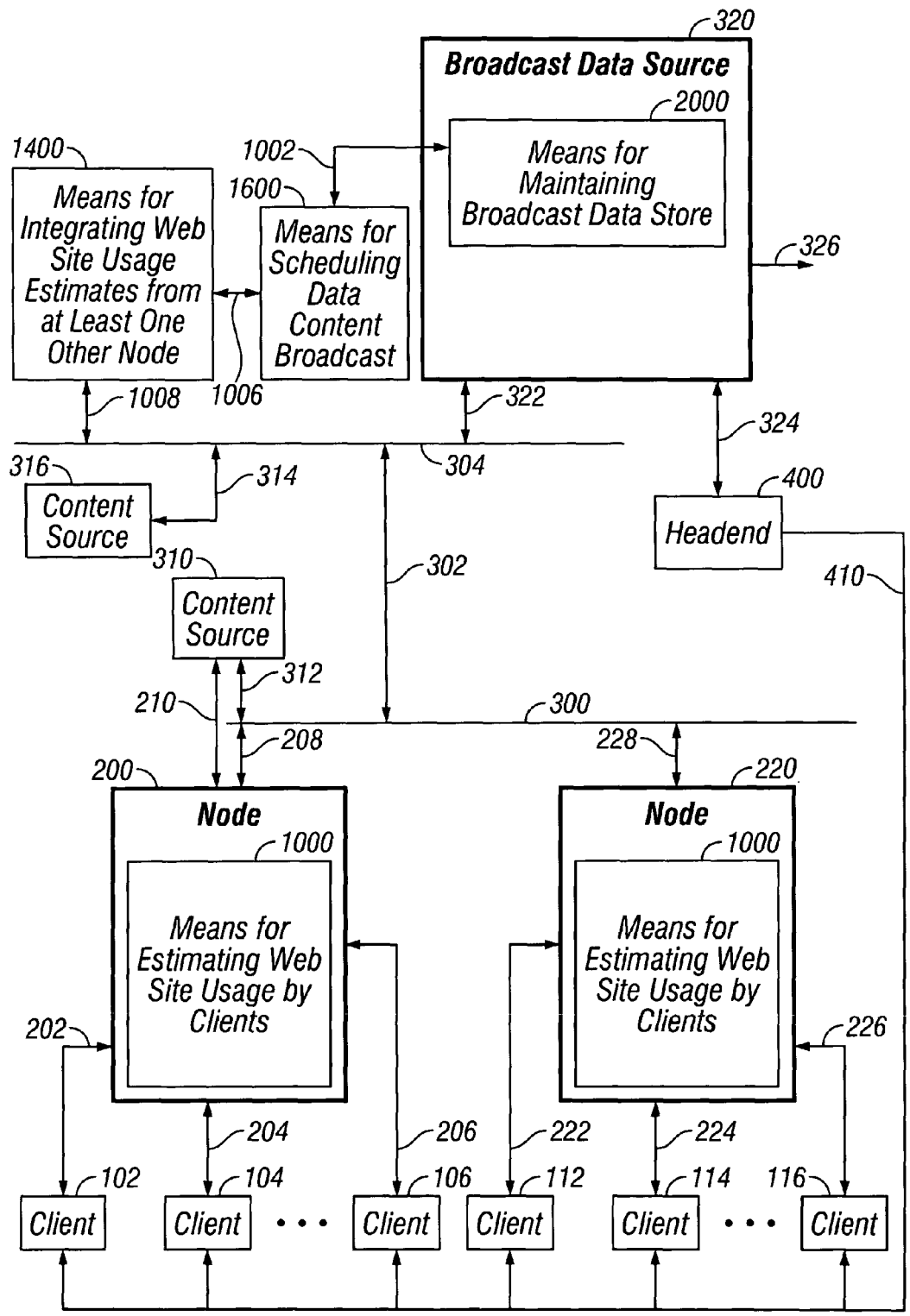
FIG. 3B depicts a simplified network diagram of an alternative arrangement to FIG. 3A.

FIG. 3B is a simplified network diagram of an alternative arrangement to that of FIG. 3A. Nodes 200 and 220 contain means for estimating web site usage 1000, each of which sends its web site usage estimates to integrating means 1400. Means 1400 presents via path 1006 the integrated web site usage estimates, formed from node 200 and 220 estimates, to scheduling means 1600.

Scheduling means 1600 presents 1002 scheduling requests to means 2000, which controls at least part of activities and resources within broadcast data source 320 responsible for broadcast data stream 324.

Figure 4A:
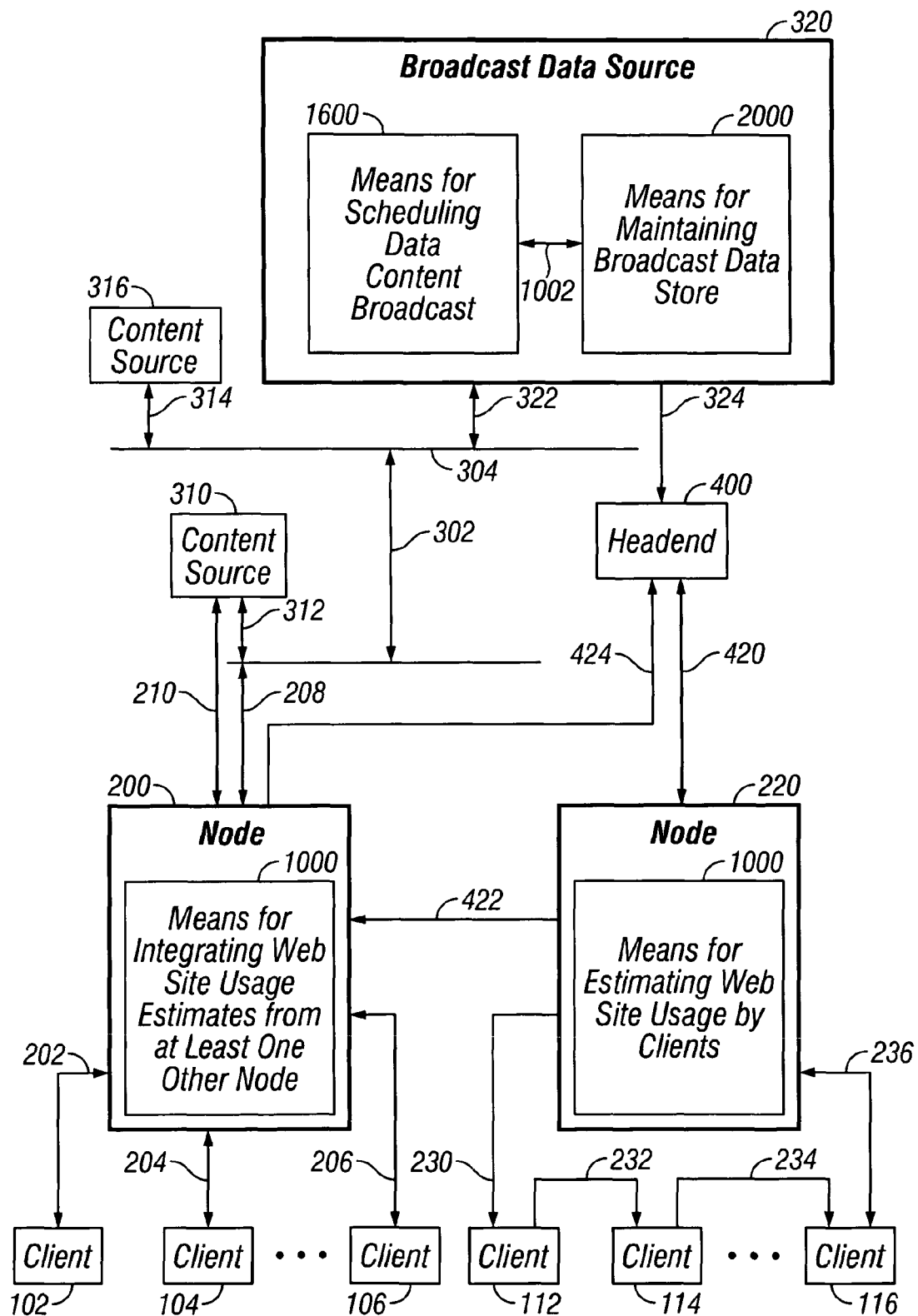
FIG. 4A depicts a simplified network diagram that provides a residential broadband delivery network using, at least in part, a local loop communications network as an alternative arrangement to that shown in FIGS. 3A-3B.

FIG. 4A is a simplified network diagram showing a residential broadband delivery network using, at least in part, a local loop communications network as an alternative arrangement to that of FIGS. 3A-3B.

In some embodiments, it may be preferred for means 1600 and means 2000 to be seen as part of broadcast data source 320, using a shared two-way communications path 322 to the two way communications network 304-302-300.

Figure 4B:
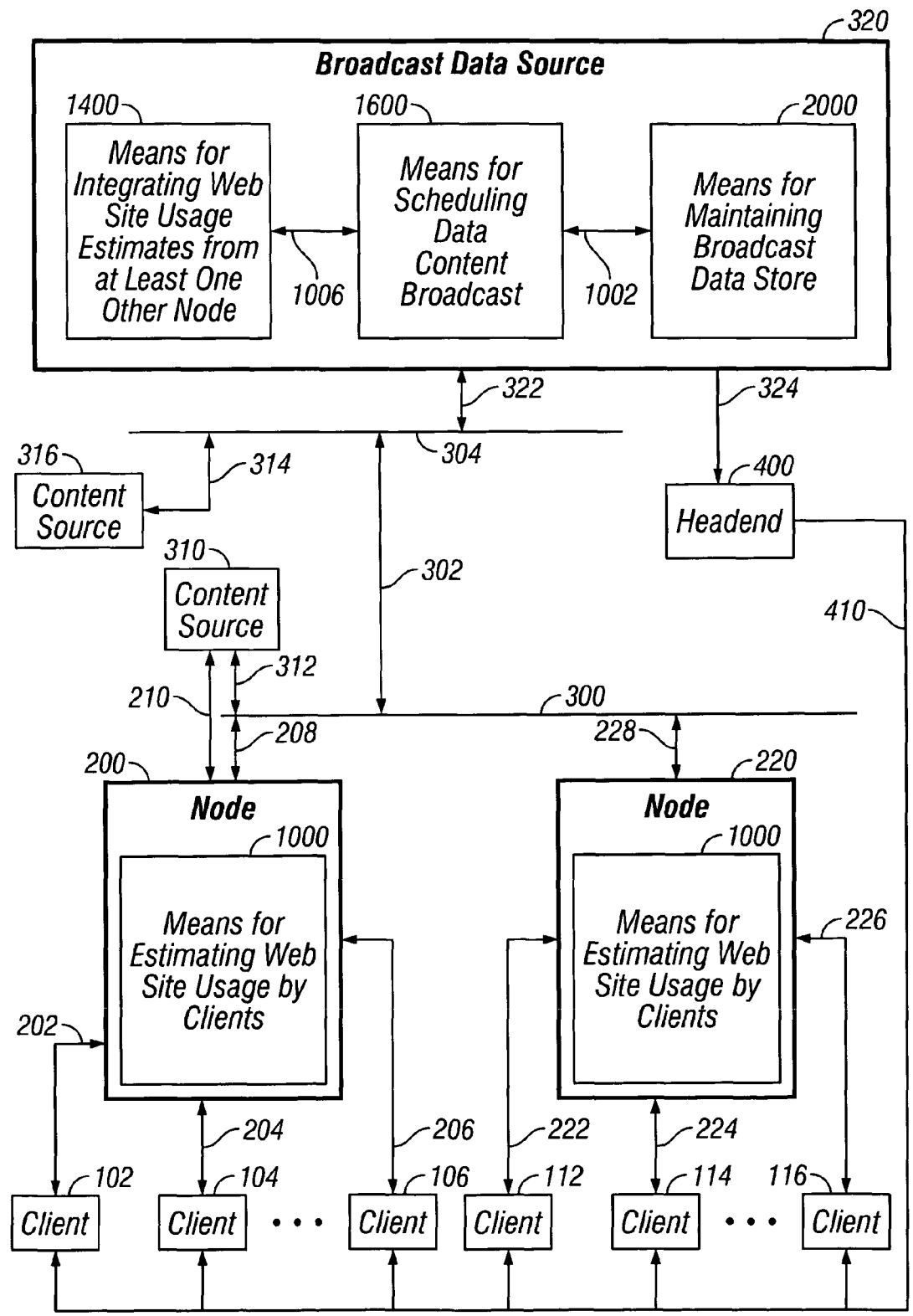
FIG. 4B depicts an alternative arrangement to FIG. 4A.

FIG. 4B is a simplified network diagram showing a residential broadband delivery network, in which means for integrating web site estimates 1400 is placed into broadcast data source 320 as an alternative arrangement to that of FIG. 4A.

Figure 5:
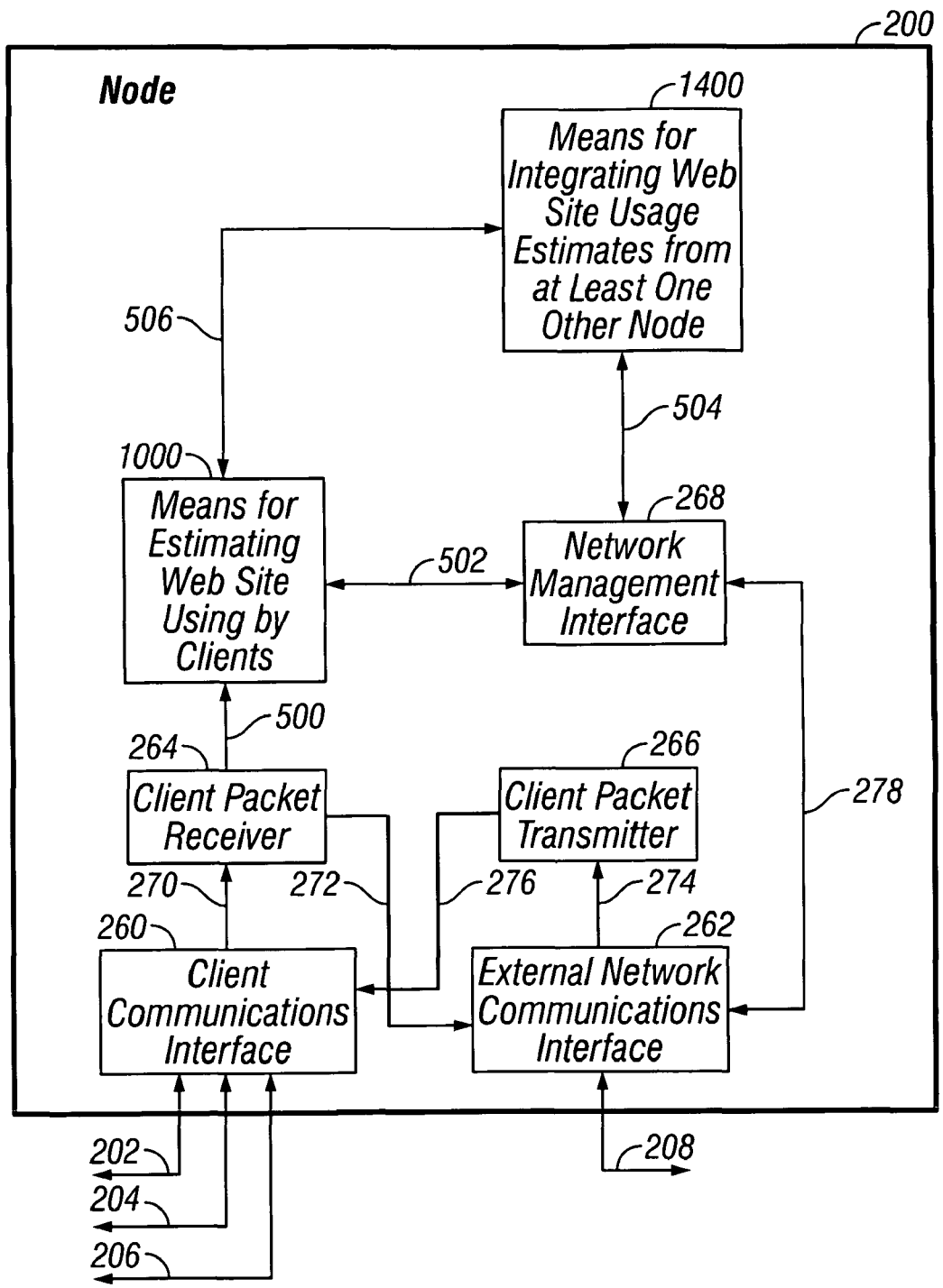
FIG. 5 depicts a simplified block diagram of a node of FIG. 2B.

FIG. 5 is a simplified block diagram of a node of FIG. 2B extended to support at least one of means 1000 and/or means 1400.

In FIG. 5, estimating client web site usage means 1000 receives information via path 500 from client packet receiver 264, which identifies client hits on web sites and their URLs. From this information, an estimate of at least one web site's usage is determined based upon its URL. This estimate is sent to at least one of the following: integrating means 1400 and/or to network management interface 278, to be forwarded to means 1400 and/or means 1600, located elsewhere.

Estimating means 1000 may communicate over path 502 via network management interface 268 with other means 1400 and/or means 1600. Such communications may include receiving directions from the scheduling means 1600, which effectively acts to limit bandwidth traffic involving at least one of the following: scheduling means 1600, means 2000, and/or across two-way path 322 with broadcast data source 320.

When both means 1000 and 1400 are active, they may communicate with each other via path 506 rather than through network management interface 268.

Figure 6:
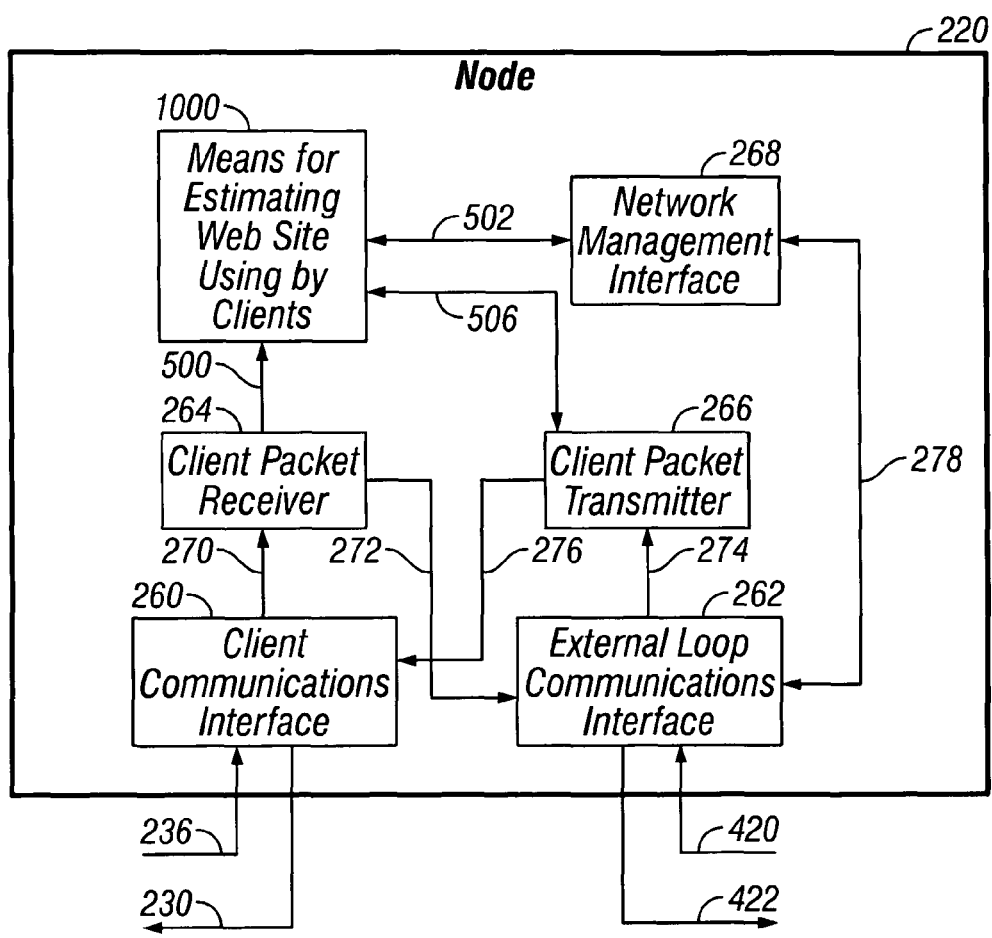
FIG. 6 depicts a simplified block diagram an alternative node to the node shown in FIG. 5.

FIG. 6 is a simplified block diagram of an alternative to the node shown in FIG. 5, which does not possess a means for integrating web site usage estimates 1400.

Figure 7:
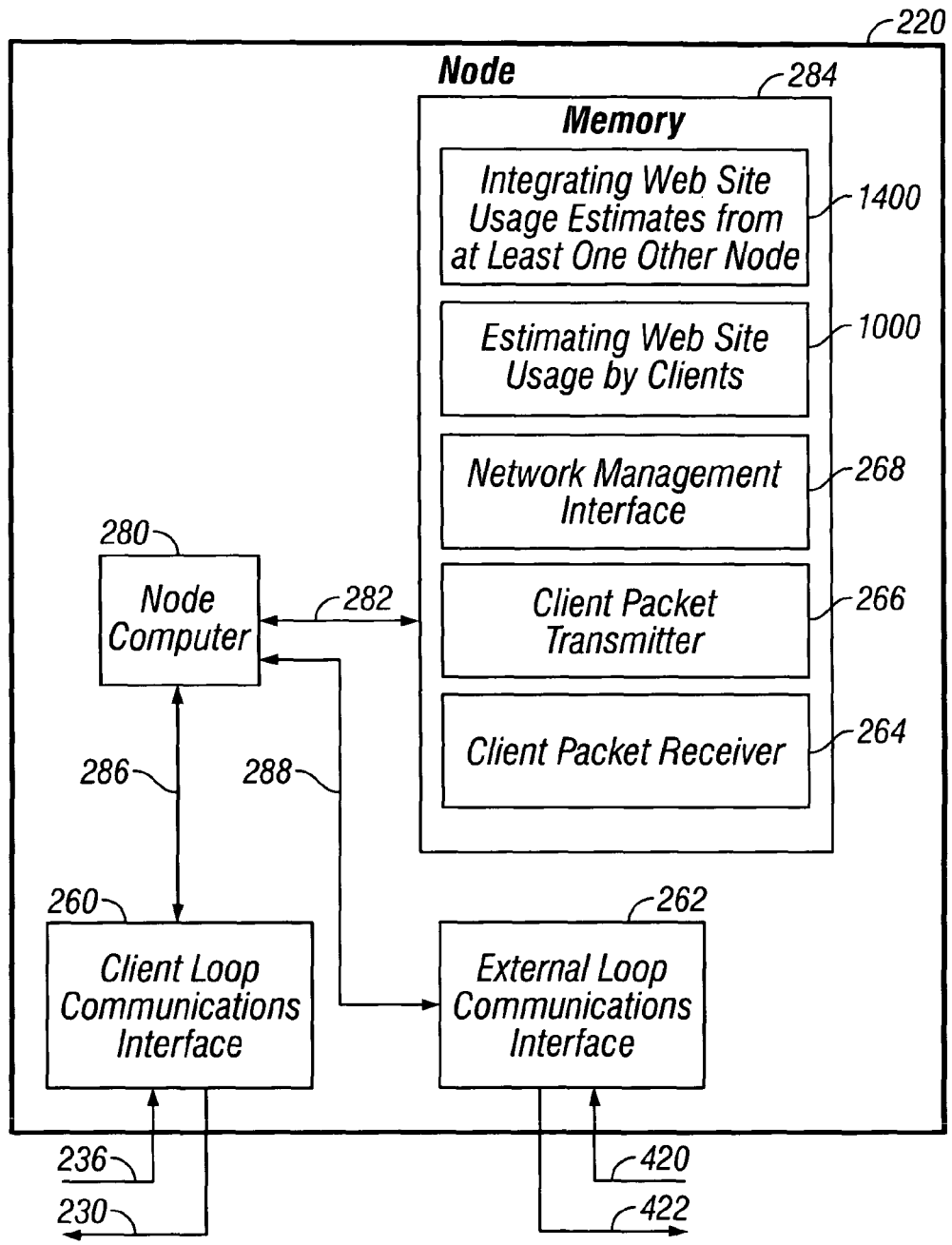
FIG. 7 depicts a simplified block diagram an alternative node to the node shown in FIGS. 5-6.

FIG. 7 is a simplified block diagram of an alternative to the node shown in FIGS. 5-6, in which estimating web site usage means 1000 and integrating web site usage estimate means 1400 are implemented as program steps residing in memory 284 accessibly coupled 282 to a computer 280.

Figure 8:
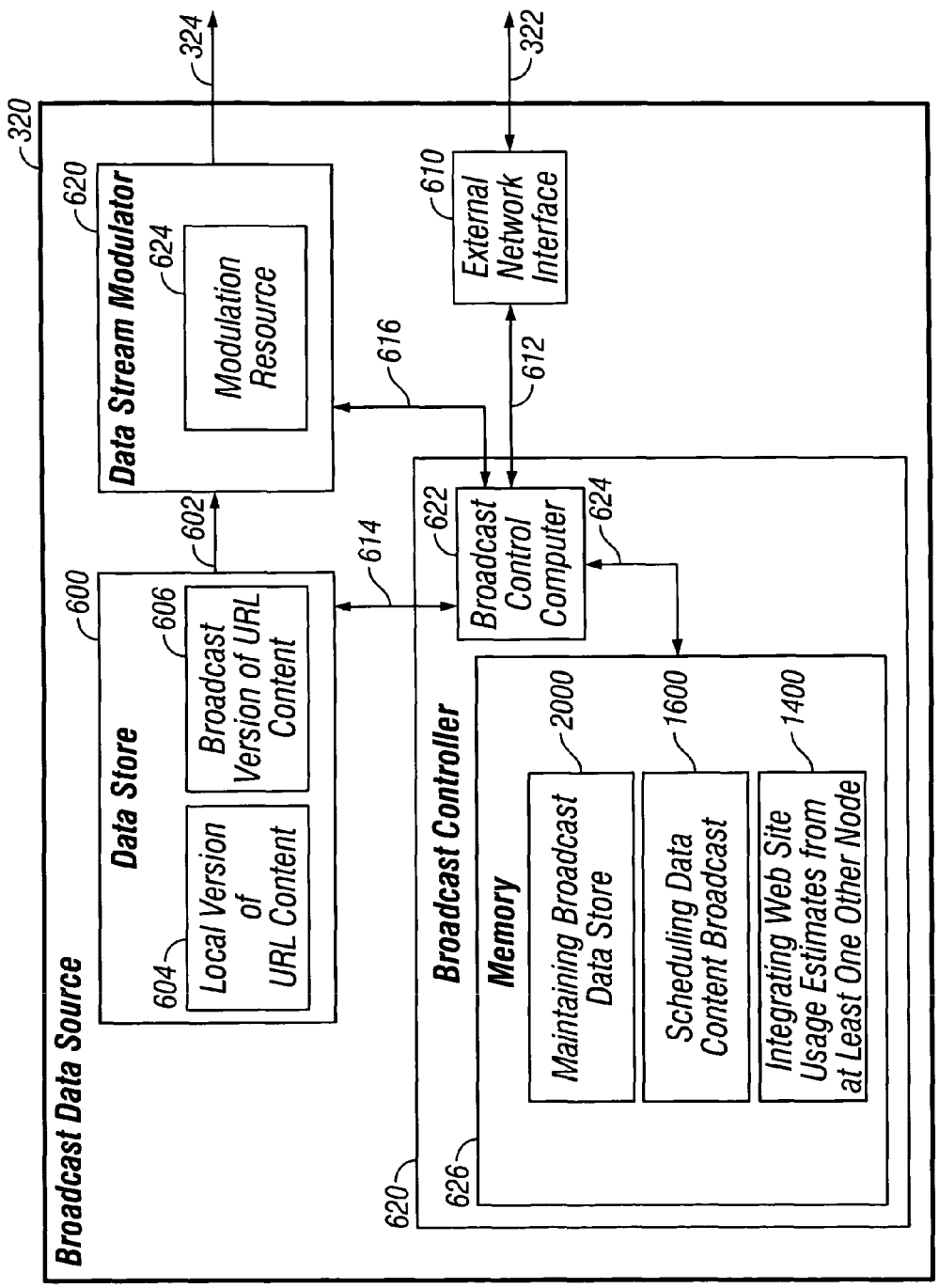
FIG. 8 depicts a simplified block diagram of a broadcast data source, that includes a mechanism for maintaining the broadcast data store, scheduling data content broadcast, and/or integrating web site estimates according to the invention.

FIG. 8 is simplified block diagram of a broadcast data source 320 in which mechanisms for maintaining the broadcast data store 2000, scheduling data content broadcast 1600, and/or integrating web site estimates 1400 are implemented as program steps residing memory 626 accessibly coupled 624 to at least one computer 622.

Data store 600 includes a local version of the content referenced by a URL 604. Data stream modulator 620 includes at least one modulation resource 624.

Figure 9:
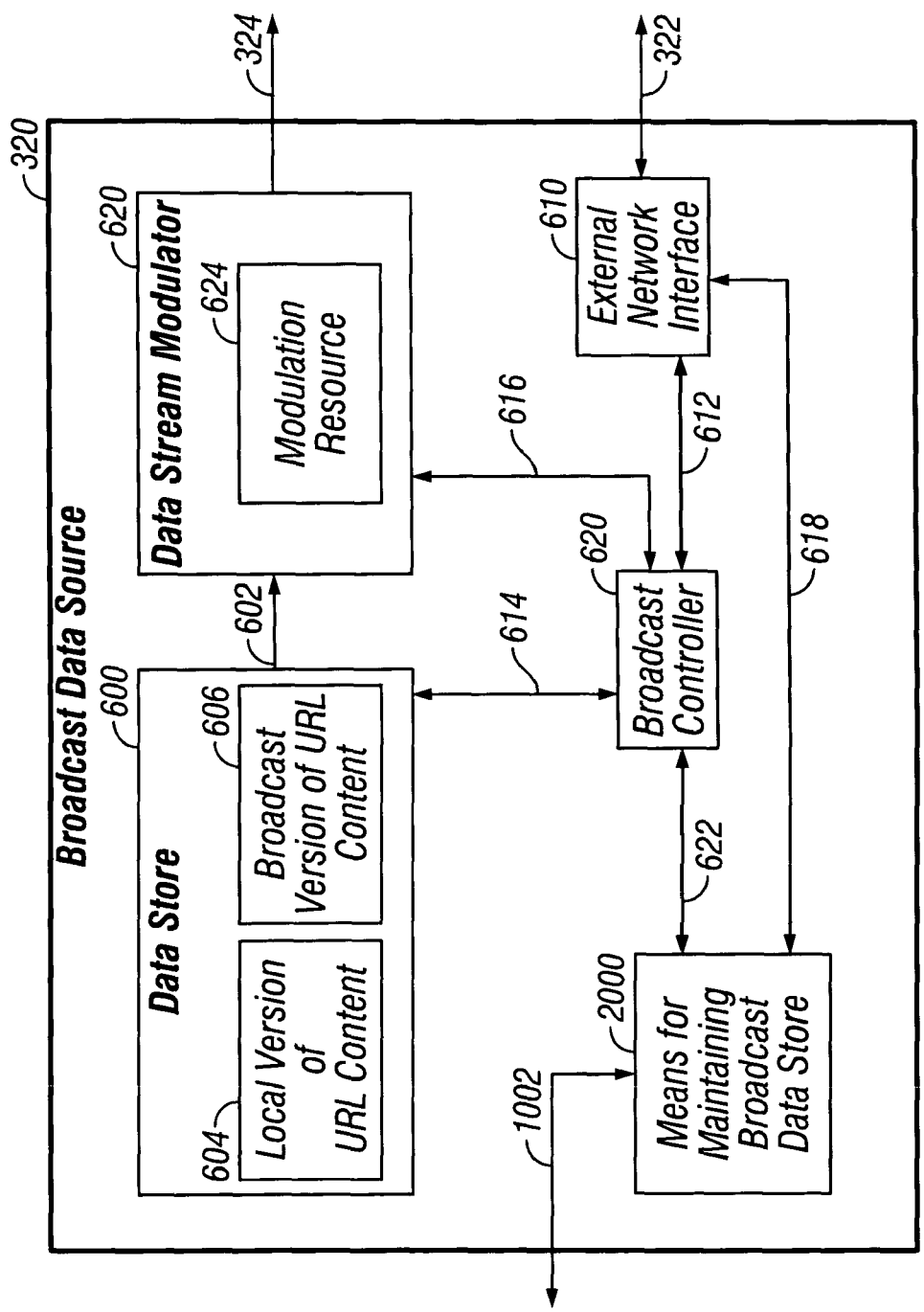
FIG. 9 is a simplified block diagram of a broadcast data source 320 that includes a mechanism for maintaining the broadcast data store in communication with an external means for scheduling.

FIG. 9 is a simplified block diagram of a broadcast data source 320 including a means for maintaining the broadcast data store 2000 in communication with an external means for scheduling 1600 (which is not shown) via path 1002.

Figure 10:
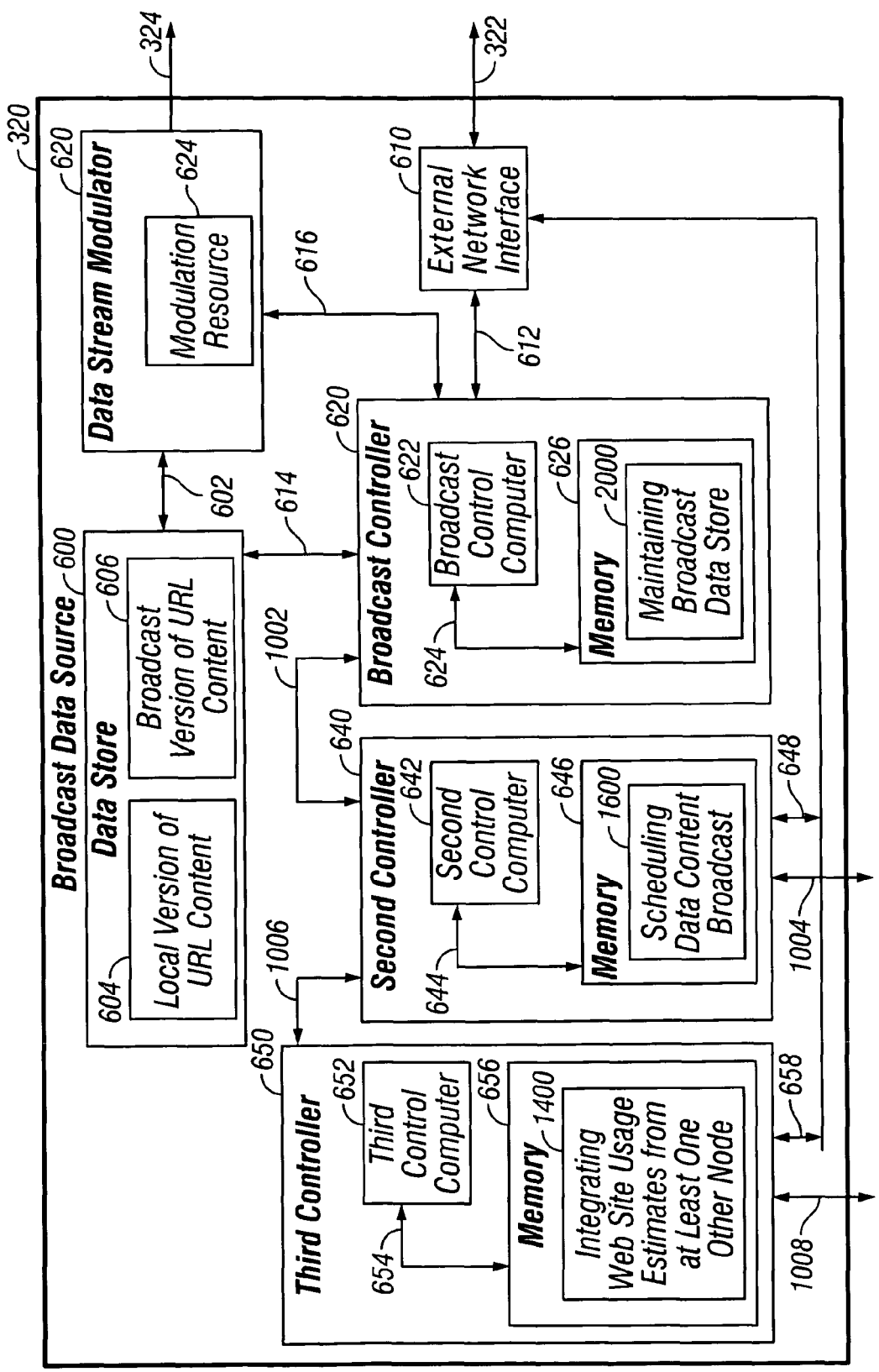
FIG. 10 is a simplified block diagram of a broadcast data source that includes a mechanism for maintaining the broadcast data store, scheduling data content broadcast and/or integrating web site estimates according to the invention.

FIG. 10 is a simplified block diagram of a broadcast data source 320 in which mechanisms for maintaining the broadcast data store 2000, scheduling data content broadcast 1600, and/or integrating web site estimates 1400 are implemented as program steps residing memories respectively accessibly coupled to separate computers.

Note that both couplings 648 and 658 to a shared two way communications interface are shown, as well as separate access paths 1008 and 1004 to two way communications. They have been shown to illustrate some of the various combinations of these paths and are not meant to limit the scope of the invention.

Figure 11:
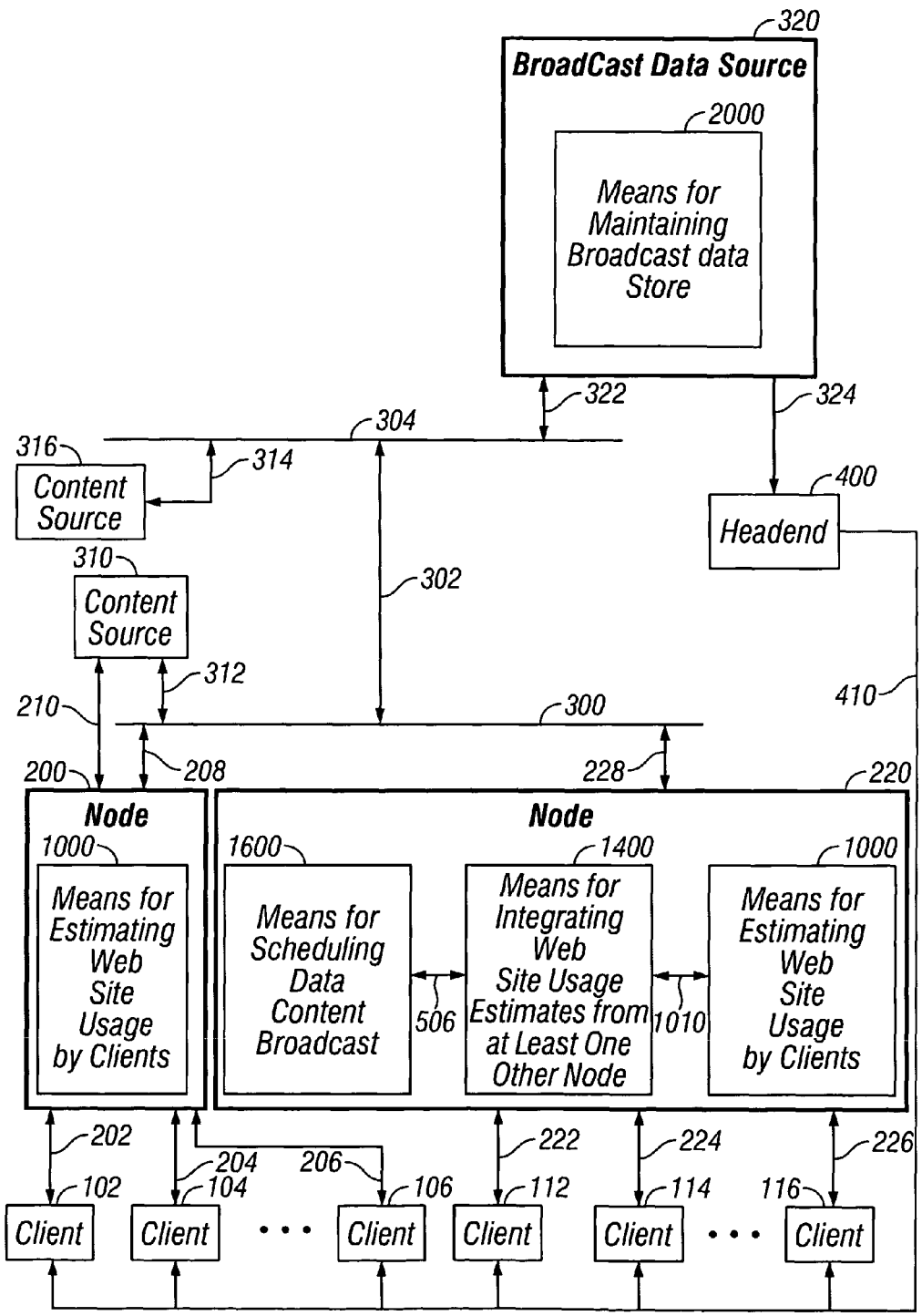
FIG. 11 is a simplified network diagram showing an alternative arrangement to FIGS. 3A-4B.

FIG. 11 is a simplified network diagram in which means for integrating web site estimates 1400, and means for estimating web site usage 1000 are integrated into node 220 as an alternative arrangement to FIGS. 3A-4B.

Figure 12:
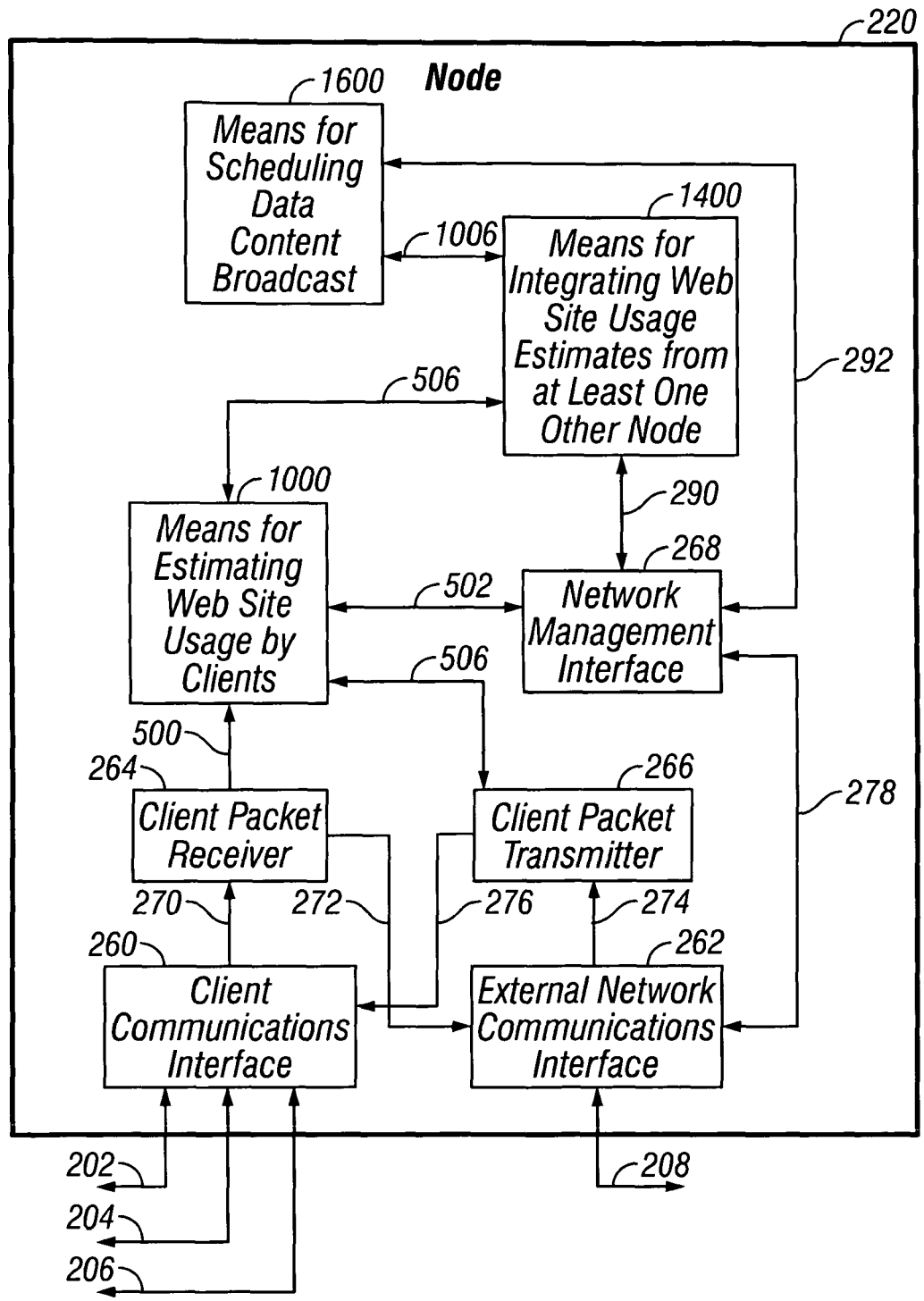
FIG. 12 is a simplified block diagram of the node shown in FIG. 11.

FIG. 12 is a simplified block diagram of node 220 shown in FIG. 11, in which means for estimating web site usage 1000, means for integrating web site usage estimates 1400, and means for scheduling 1600 are included.

Means for scheduling data content broadcast 1600 communicates to means 2000 of FIG. 11 via path 292 to network management interface 268 which sends communications via path 278 to external network communications interface 262 and then to the external network via path 208.

Figure 13:
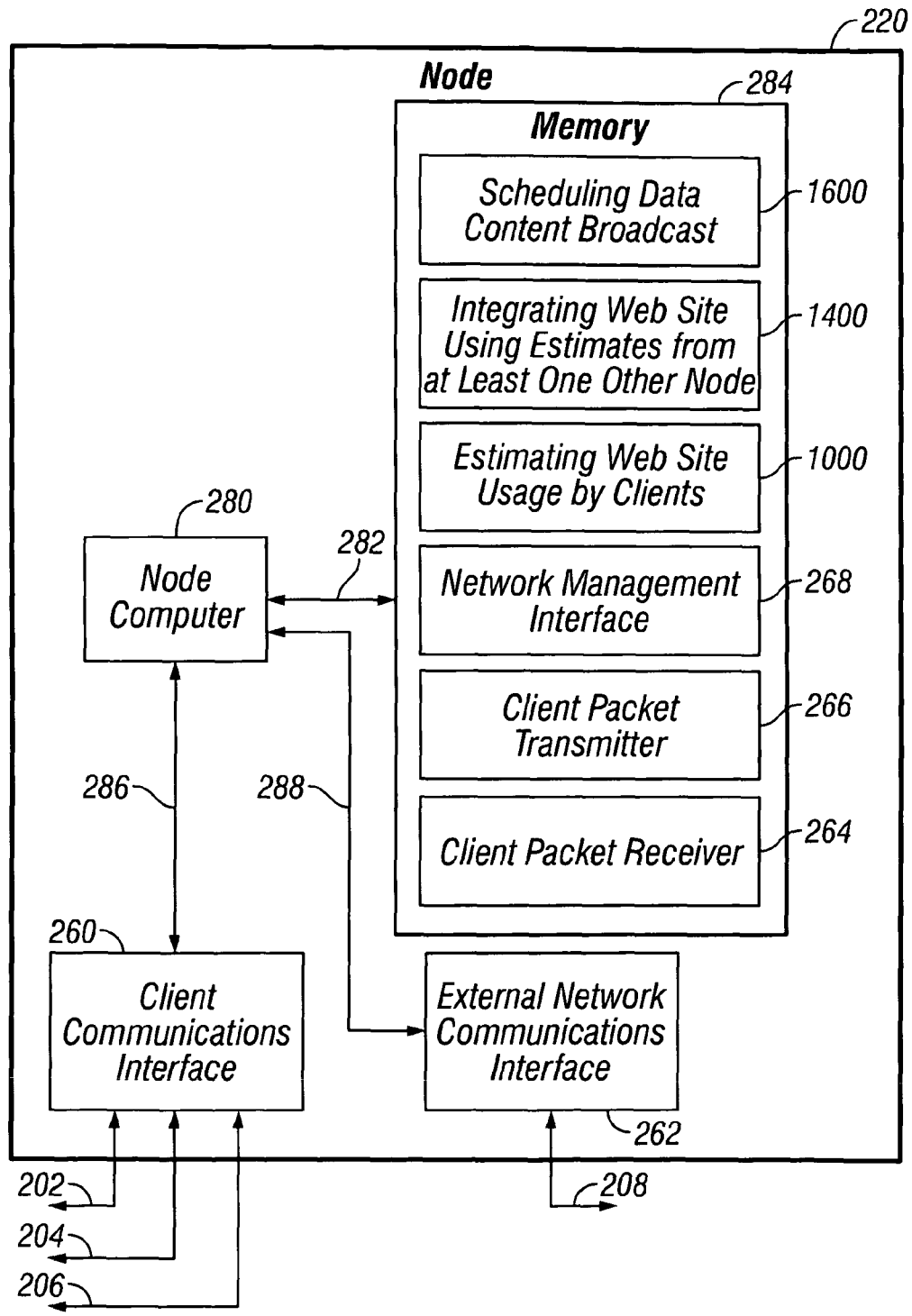
FIG. 13 is an alternative simplified block diagram of the node shown in FIG. 11.

FIG. 13 is a simplified block diagram of an alternative embodiment node 220 shown in FIG. 11, in which mechanisms for estimating web site usage means 1000, integrating web site usage estimates means 1400, and scheduling means 1400 are implemented as program steps in memory 284 accessibly coupled 282 to at least one computer 280.

Figure 14A:
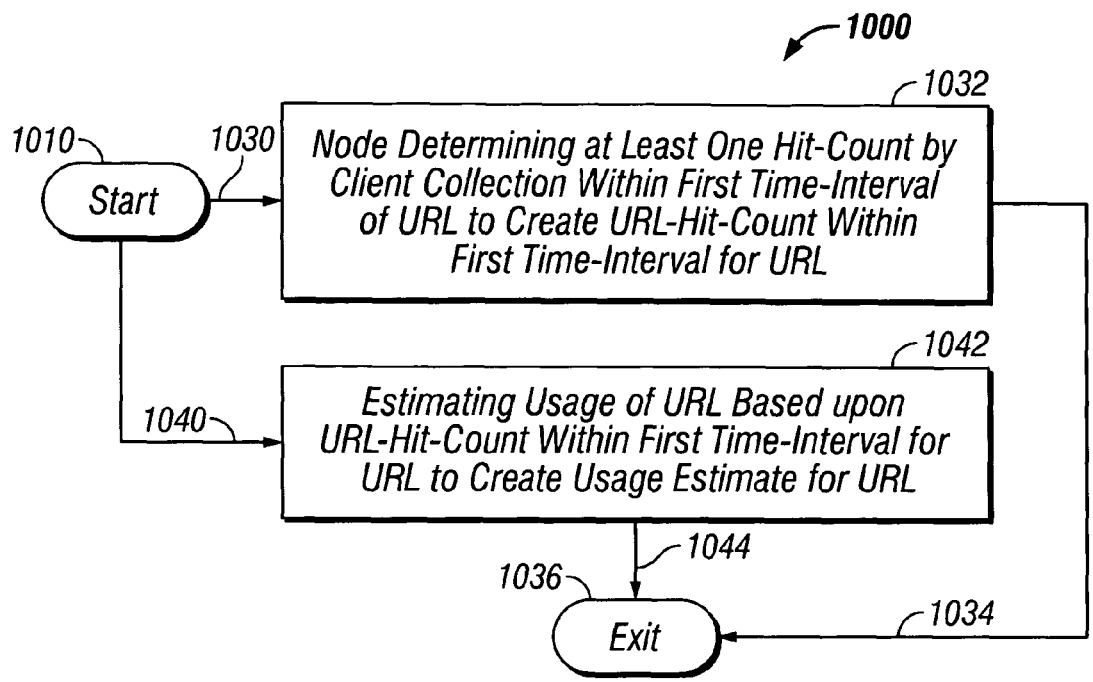
FIG. 14A is a detailed flowchart showing operation of the system shown in FIGS. 3A to 8.

FIG. 14A is a detailed flowchart showing a mechanism within said means for estimating web site usage by clients for creating at least a usage estimate of at least one URL based upon a node communicating with a collection of at least two clients.

Arrow 1030 directs the flow of execution from starting operation 1010 to operation 1032. Operation 1032 performs the step in which a node determines at least one hit-count by a collection of at least two clients. The hit-count is determined within a first a time-interval to create a URL-hit-count within the first time-interval for a URL. Arrow 1034 directs execution from operation 1032 to operation 1036. Operation 1032 terminates the operations of this flowchart.

Arrow 1040 directs the flow of execution from starting operation 1010 to operation 1042. Operation 1042 performs the step of estimating the usage of the URL based upon the URL-hit-count within the first time-interval to create a usage estimate for the URL. Arrow 1044 directs execution from operation 1042 to operation 1036. Operation 1036 terminates the operations of this flowchart.

Figure 14B:
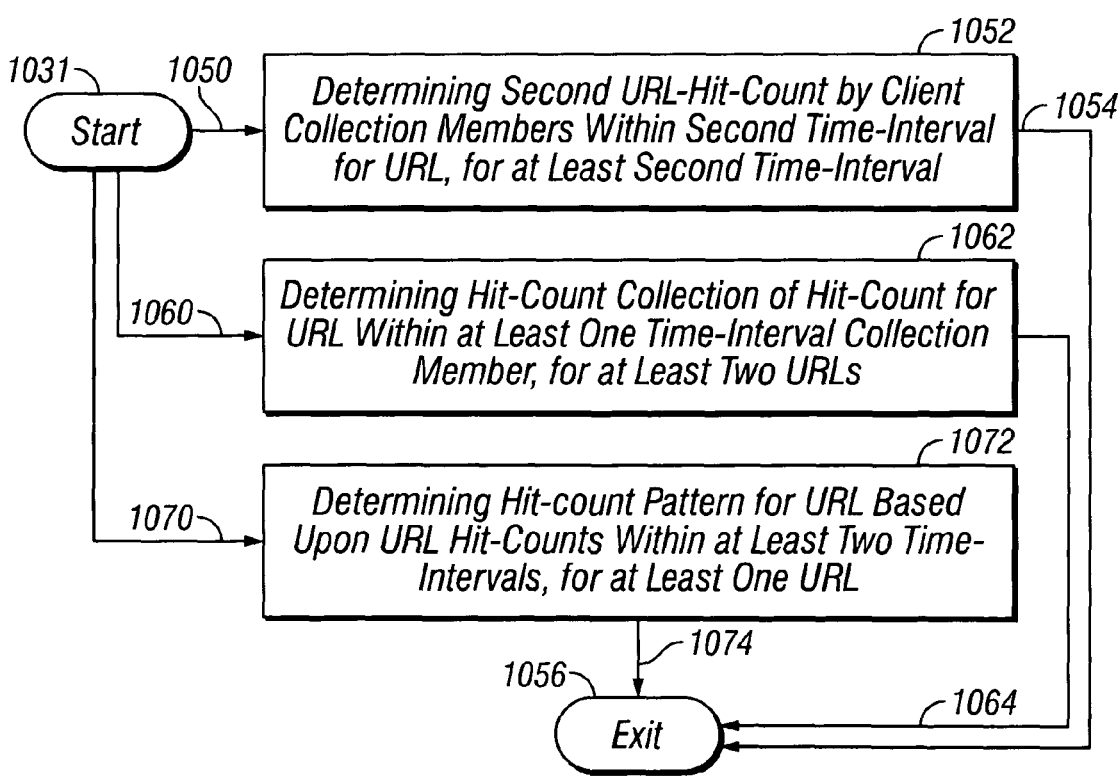
FIG. 14B is a detailed flowchart showing a mechanism for determining the hit-count according to the invention.

FIG. 14B is a detailed flowchart showing the mechanism for determining the hit-count 1032 (See FIG. 14A).

Arrow 1050 directs the flow of execution from starting operation 1031 to operation 1052. Operation 1052 performs the step of determining a second of the URL-hit-counts by the client collection members within a second of time-interval. Arrow 1054 directs execution from operation 1052 to operation 1056. Operation 1056 terminates the operation of this flowchart.

Arrow 1060 directs the flow of execution from starting operation 1031 to operation 1062. Operation 1062 performs the step of determining a hit-count collection of a hit-count for the URL within at least one of the time-interval collection members, for at least two of the URLs. Arrow 1064 directs execution from operation 1062 to operation 1056. Operation 1056 terminates the operation of this flowchart.

Arrow 1070 directs the flow of execution from starting operation 1031 to operation 1072. Operation 1072 performs the step of determining a hit-count pattern for the URL based upon the URL hit-counts within at least two time-interval collection members, for at least one of the URLs. Arrow 1074 directs execution from operation 1072 to operation 1056. Operation 1056 terminates the operation of this flowchart.

Figure 15A:
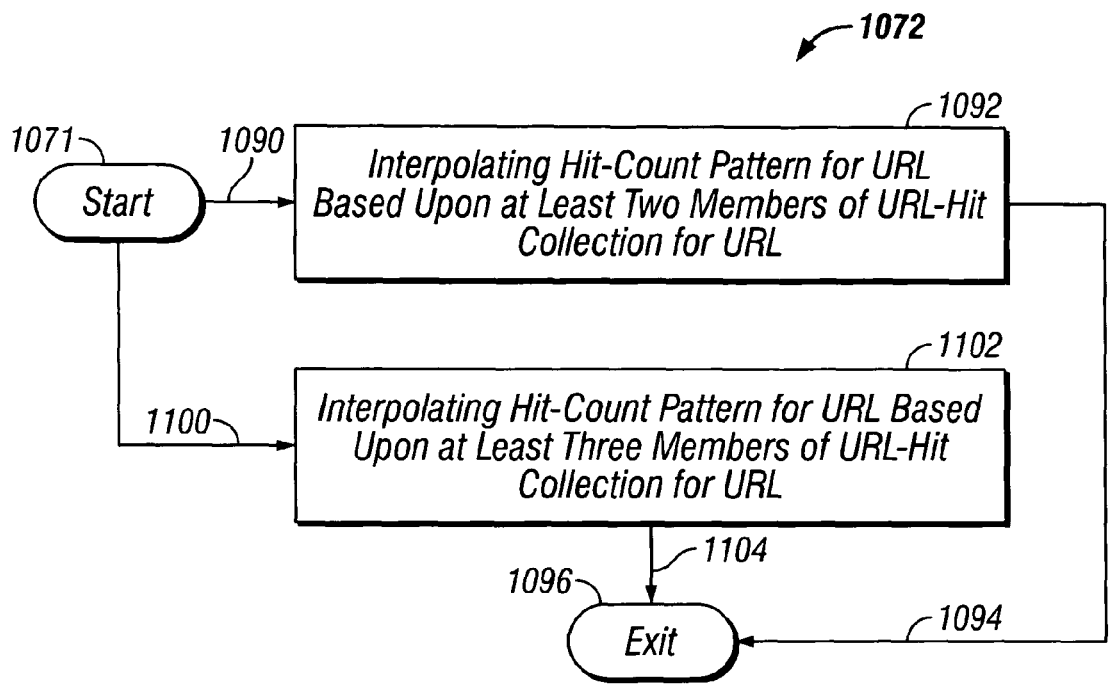
FIG. 15A is a detailed flowchart showing a mechanism for determining the hit-count pattern for the URL according to the invention.

FIG. 15A is a detailed flowchart showing a mechanism for determining the hit-count pattern for the URL 1072 (See FIG. 14B).

Arrow 1090 directs the flow of execution from starting operation 1071 to operation 1092. Operation 1092 performs the step of interpolating the hit-count pattern for the URL based upon at least two members of the URL-hit collection for the URL. Arrow 1094 directs execution from operation 1092 to operation 1096. Operation 1096 terminates the operation of this flowchart.

Arrow 1100 directs the flow of execution from starting operation 1071 to operation 1102. Operation 1102 performs the step of interpolating the hit-count pattern for the URL based upon at least three members of the URL-hit collection for the URL. Arrow 1104 directs execution from operation 1102 to operation 1096. Operation 1096 terminates the operation of this flowchart.

Note that certain embodiments of the invention may interpolate based upon at least two URL-hit collection members, while other embodiments may further be based upon at least three URL-hit collection members.

Figure 15B:
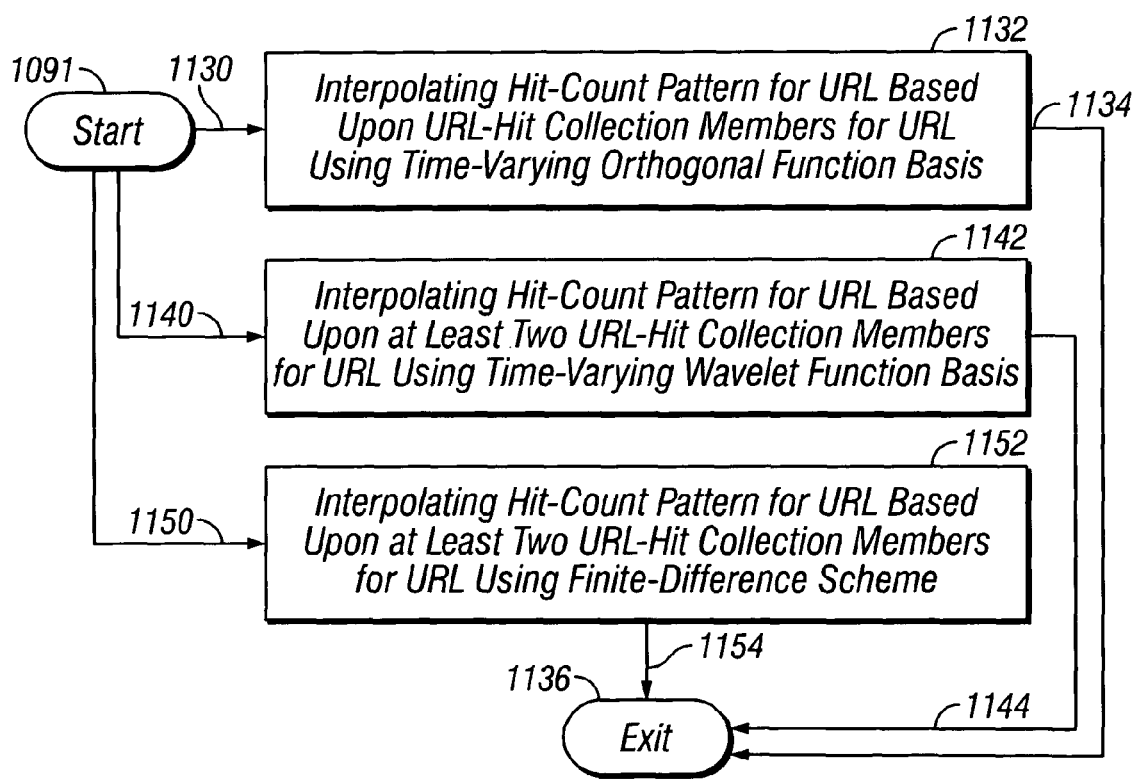
FIG. 15B is a detailed flowchart showing a mechanism for interpolating the hit-count pattern for the URL according to the invention.

FIG. 15B is a detailed flowchart showing a mechanism for interpolating the hit-count pattern for the URL 1092, 1102 (See FIG. 15A).

Arrow 1130 directs the flow of execution from starting operation 1091 to operation 1132. Operation 1132 performs the step of interpolating the hit-count pattern for the URL based upon the at least two URL-hit collection members for the URL using a time-varying orthogonal function basis. Such functions are well known to those skilled the art. Arrow 1134 directs execution from operation 1132 to operation 1136. Operation 1136 terminates the operation of this flowchart.

Arrow 1140 directs the flow of execution from starting operation 1091 to operation 1142. Operation 1142 performs the step of interpolating the hit-count pattern for the URL based upon the at least two URL-hit collection members for the URL using a time-varying wavelet function basis. Such functions are well known to those skilled in the art. Arrow 1144 directs execution from operation 1142 to operation 1136. Operation 1136 terminates the operation of this flowchart.

Arrow 1150 directs the flow of execution from starting operation 1091 to operation 1152. Operation 1152 performs the step of interpolating the hit-count pattern for the URL based upon the at least two URL-hit collection members for the URL using a finite-difference scheme. Such functions are well known to those skilled in the art. Arrow 1154 directs execution from operation 1152 to operation 1136. Operation 1136 terminates the operation of this flowchart.

As used herein, the time-varying orthogonal function basis includes at least any of the following: linear time-varying functions, polynomial time-varying functions, and exponential time-varying functions.

Figure 16A:
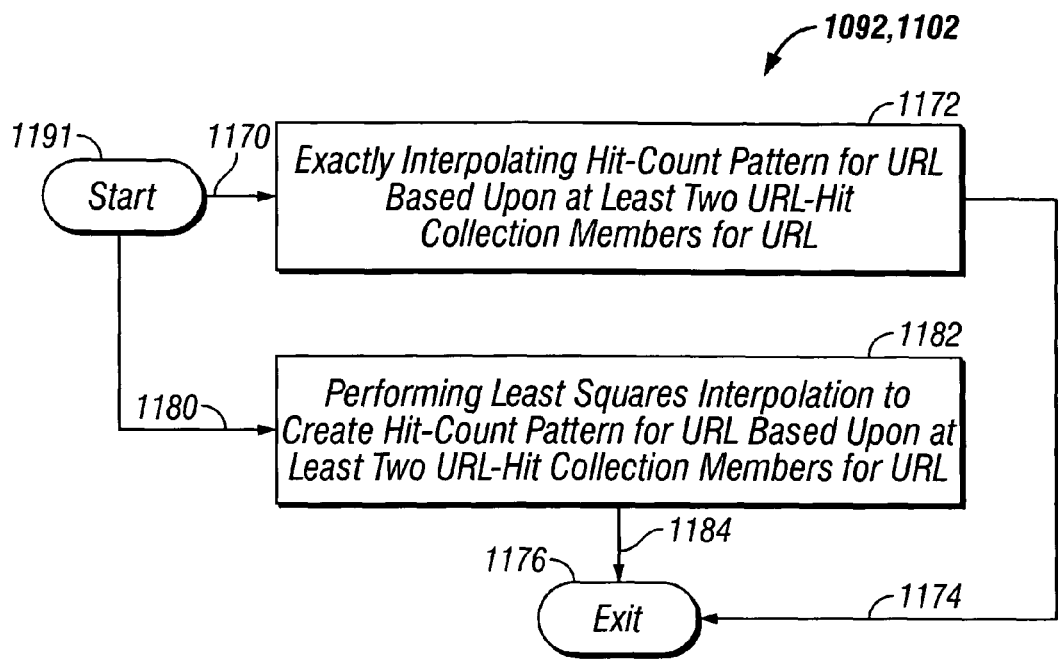
FIG. 16A is a detailed flowchart showing a mechanism for interpolating the hit-count pattern for the URL based upon at least two or three members of the URL-hit collection for the URL according to the invention.

FIG. 16A is a detailed flowchart showing a mechanism for interpolating the hit-count pattern for the URL based upon at least two or three members of the URL-hit collection for the URL 1092,1103 (See FIG. 15A).

Arrow 1170 directs the flow of execution from starting operation 1091 to operation 1172. Operation 1172 performs the step of exactly interpolating the hit-count pattern for the URL based upon the at least two URL-hit collection members for the URL. Arrow 1174 directs execution from operation 1172 to operation 1176. Operation 1176 terminates the operation of this flowchart.

Arrow 1180 directs the flow of execution from starting operation to operation 1182. Operation 1182 performs performing a least squares interpolation to create the hit-count pattern for the URL based upon the at least two URL-hit collection members for the URL. Arrow 1184 directs execution from operation 1182 to operation 1176. Operation 1176 terminates the operation of this flowchart.

Figure 16B:
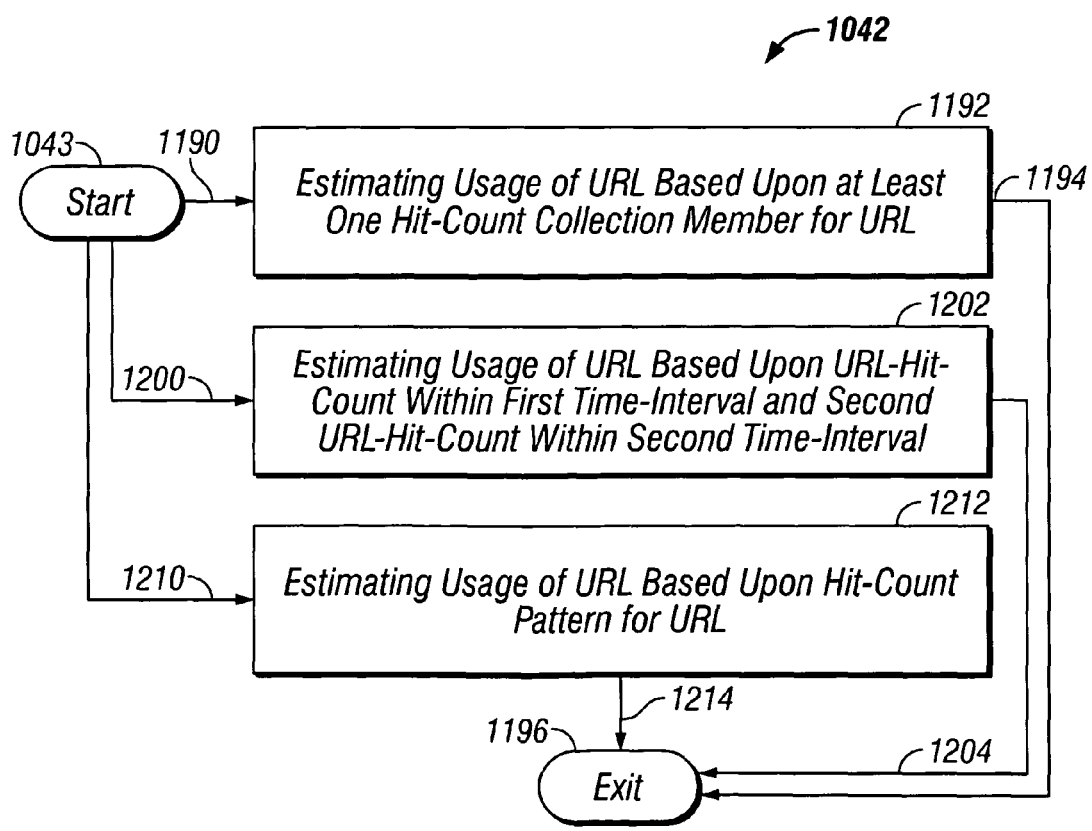
FIG. 16B is a detailed flowchart showing a mechanism for estimating the usage of the URL according to the invention.

FIG. 16B is a detailed flowchart showing a mechanism for estimating the usage of the URL 1042.

Arrow 1190 directs the flow of execution from starting operation 1043 to operation 1192. Operation 1192 performs the step of estimating the usage of the URL based upon at least one of the hit-count collection members for the URL. Arrow 1194 directs execution from operation 1192 to operation 1196. Operation 1196 terminates the operation of this flowchart.

Arrow 1200 directs the flow of execution from starting operation 1043 to operation 1202. Operation 1202 performs the step of estimating the usage of the URL based upon the URL-hit-count within the first time-interval and the second URL-hit-count within the second time-interval, both for the URL and for at least one of the second time-intervals. Arrow 1204 directs execution from operation 1202 to operation 1196. Operation 1196 terminates the operation of this flowchart.

Arrow 1210 directs the flow of execution from starting operation 1043 to operation 1212. Operation 1212 performs the step of estimating the usage of the URL based upon the hit-count pattern for the URL. Arrow 1214 directs execution from operation 1212 to operation 1196. Operation 1196 terminates the operation of this flowchart.

Figure 17A:
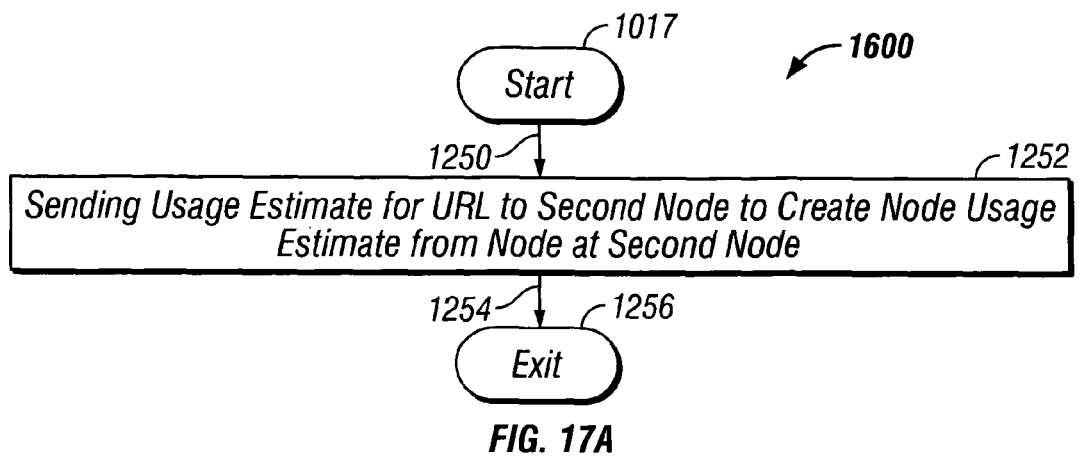
FIG. 17A is a detailed flowchart showing a mechanism for creating at least a usage estimate of at least one URL according to the invention.

FIG. 17A is a detailed flowchart showing a mechanism within said means for estimating web site usage by clients 1000 for creating at least a usage estimate of at least one URL.

Arrow 1250 directs the flow of execution from starting operation 1017 to operation 1252. Operation 1252 performs the step of sending the usage estimate for the URL to a second of the nodes to create a node usage estimate from the node at the second node. Arrow 1254 directs execution from operation 1252 to operation 1256. Operation 1256 terminates the operation of this flowchart.

Figure 17B:
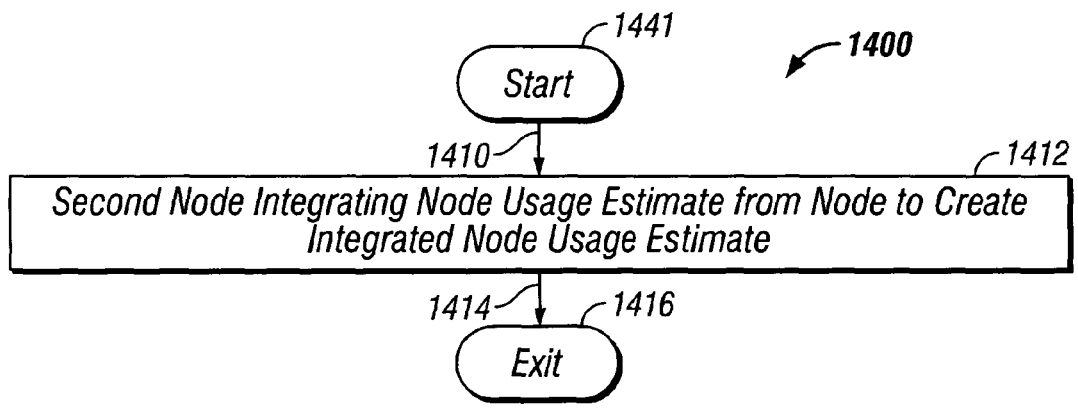
FIG. 17B is a detailed flowchart showing a mechanism for integrating web site usage estimates from at least one other node according to the invention.

FIG. 17B is a detailed flowchart showing a mechanism for integrating web site usage estimates from at least one other node 1400.

Arrow 1410 directs the flow of execution from starting operation 1441 to operation 1412. Operation 1412 performs the step of the second node integrating the node usage estimate from the node to create an integrated node usage estimate. Arrow 1414 directs execution from operation 1412 to operation 1416. Operation 1416 terminates the operation of this flowchart.

Figure 17C:
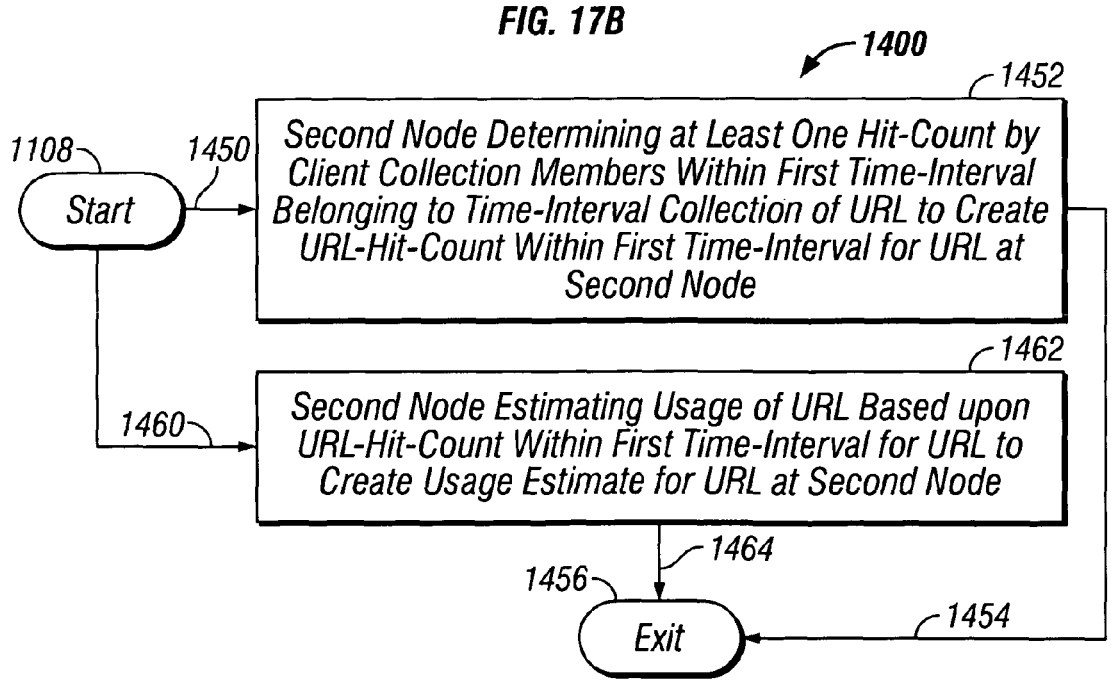
FIG. 17C is a detailed flowchart showing a mechanism for integrating web site usage estimates from at least one other node according to the invention.

FIG. 17C is a detailed flowchart showing a mechanism for integrating web site usage estimates from at least one other node 1400 (See FIG. 17B).

Arrow 1450 directs the flow of execution from starting operation 1108 to operation 1452. Operation 1452 performs the step of the second node determining at least one hit-count by the client collection members within the first time-interval to create a URL-hit-count within the first time-interval for the URL at the second node. Arrow 1454 directs execution from operation 1452 to operation 1456. Operation 1456 terminates the operation of this flowchart.

Arrow 1460 directs the flow of execution from starting operation 1108 to operation 1462. Operation 1462 performs the step of the second node estimating the usage of the URL based upon the URL-hit-count within the first time-interval for the URL to create a usage estimate for the URL at the second node. Arrow 1464 directs execution from operation 1462 to operation 1456. Operation 1456 terminates the operation of this flowchart.

In some embodiments, it is preferred that the second node communicates, at least in part, with different clients than the node.

Figure 18A:
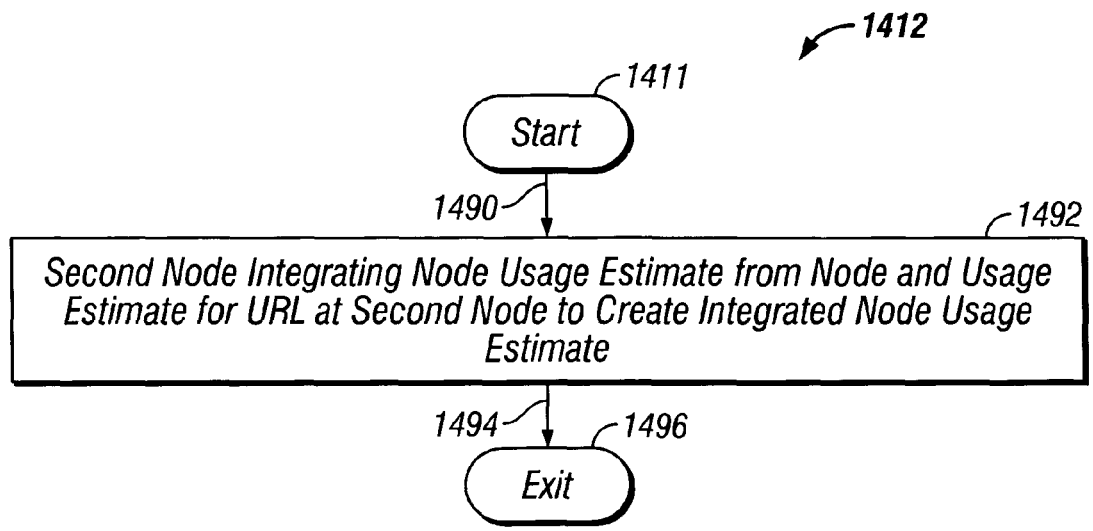
FIG. 18A is a detailed flowchart showing a second node integrating the node usage estimate from the node according to the invention.

FIG. 18A is a detailed flowchart showing a mechanism for the second node integrating the node usage estimate from the node 1412 (See FIG. 17B). Arrow 1490 directs the flow of execution from starting operation 1411 to operation 1492. Operation 1492 performs the step of the second node integrating the node usage estimate from the node and the usage estimate for the URL at the second node to create the integrated node usage estimate. Arrow 1494 directs execution from operation 1492 to operation 1496. Operation 1496 terminates the operation of this flowchart.

Figure 18B:
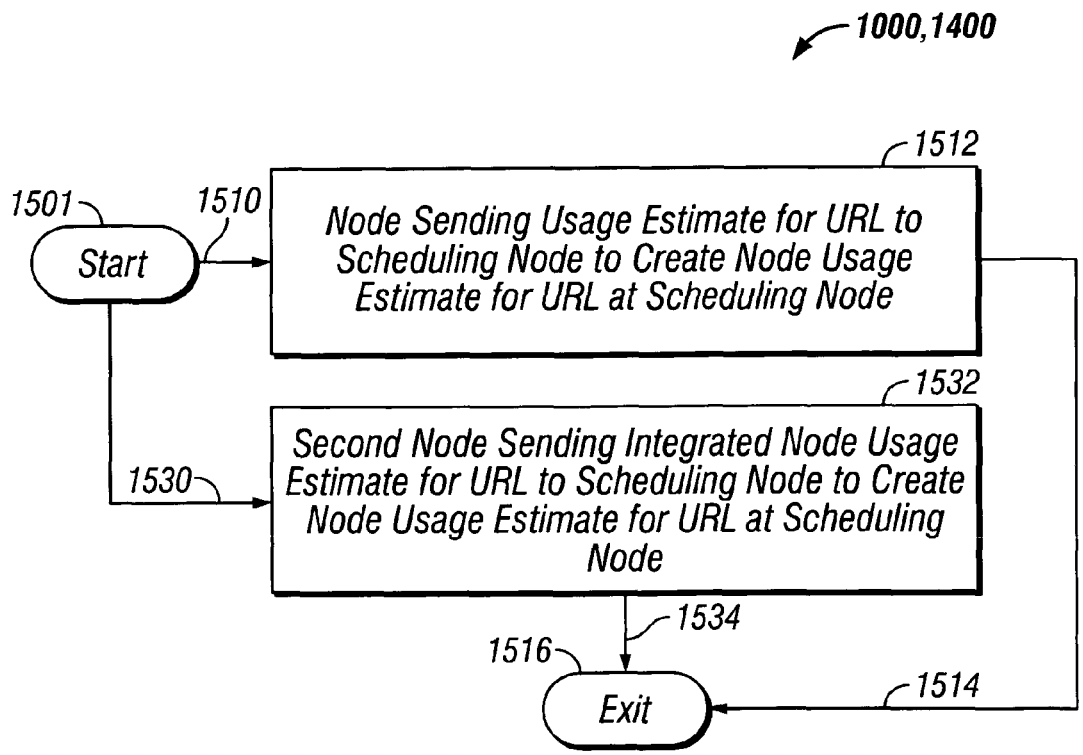
FIG. 18B is a detailed flowchart showing a mechanism for estimating usage and/or integrating usage estimates according to the invention.

FIG. 18B is a detailed flowchart showing a mechanism for estimating usage and/or integrating usage estimates 1000, 1400.

Arrow 1510 directs the flow of execution from starting operation 1501 to operation 1512. Operation 1512 performs the step of the node sending the usage estimate for the URL to a scheduling node to create a node usage estimate for the URL at the scheduling node. Arrow 1514 directs execution from operation 1512 to operation 1516. Operation 1516 terminates the operation of this flowchart.

Arrow 1530 directs the flow of execution from starting operation 1501 to operation 1532. Operation 1532 performs the step of the second node sending the integrated node usage estimate for the URL to the scheduling node to create the node usage estimate for the URL at the scheduling node. Arrow 1534 directs execution from operation 1532 to operation 1516. Operation 1516 terminates the operation of this flowchart.

Figure 19A:
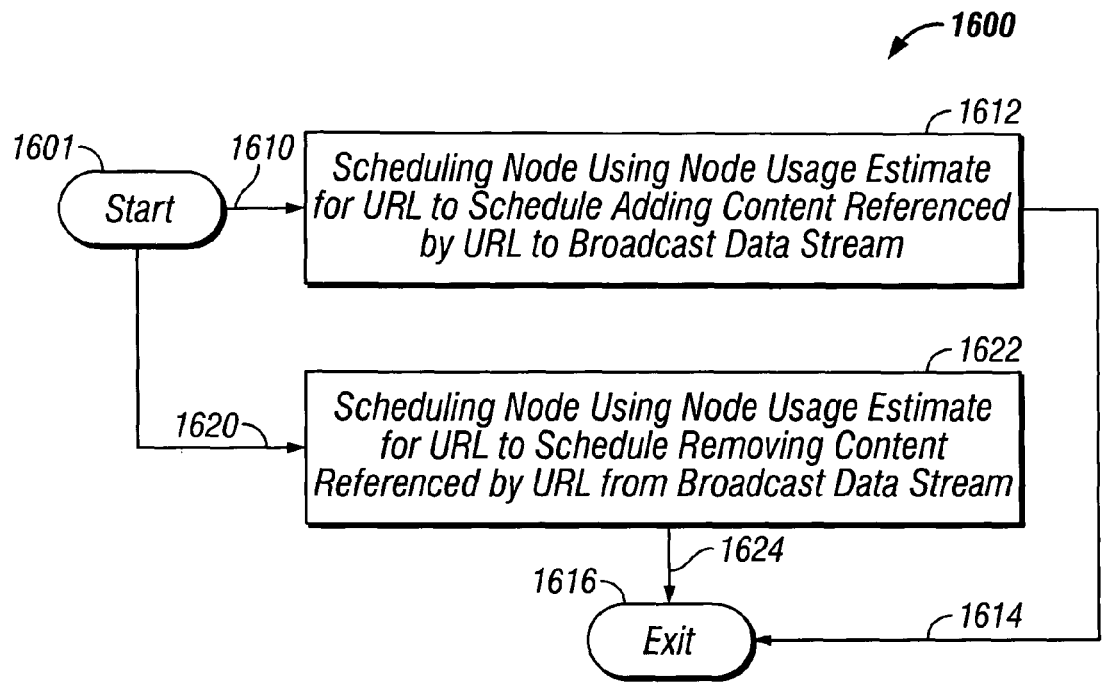
FIG. 19A is a detailed flowchart showing a mechanism for the method of scheduling data broadcast according to the invention.

FIG. 19A is a detailed flowchart showing a mechanism for scheduling data broadcast 1600.

Arrow 1610 directs the flow of execution from starting operation 1601 to no operation 1612. Operation 1612 performs the step of the scheduling node using the node usage estimate for the URL to schedule the addition of content referenced by the URL to a broadcast data stream. Arrow 1614 directs execution from operation 1612 to operation 1616. Operation 1616 terminates the operation of this flowchart.

Arrow 1620 directs the flow of execution from starting operation 1601 to operation 1622. Operation 1622 performs the step of the scheduling node using the node usage estimate for the URL to schedule removal of the content referenced by the URL from the broadcast data stream. Arrow 1624 directs execution from operation 1622 to operation 1616. Operation 1616 terminates the operation of this flowchart.

Figure 19B:
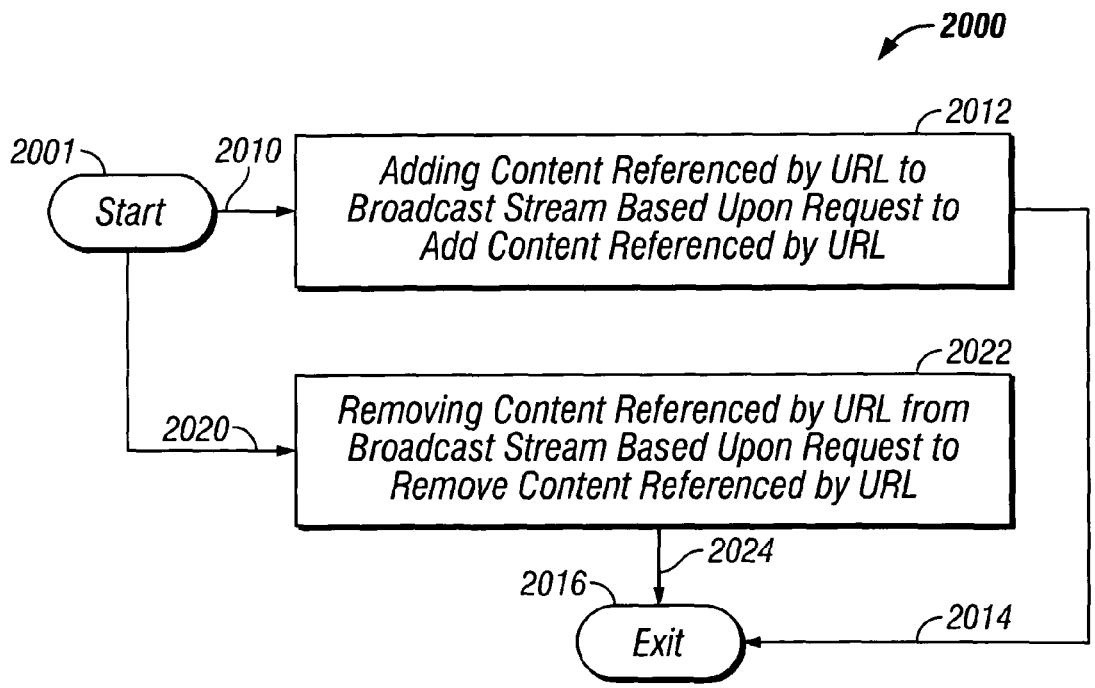
FIG. 19B is a detailed flowchart showing a mechanism for maintaining the broadcast data store according to the invention.

FIG. 19B is a detailed flowchart showing a mechanism for maintaining the broadcast data store 2000.

Arrow 2010 directs the flow of execution from starting operation 2001 to operation 2012. Operation 2012 performs the step of adding content referenced by a URL to the broadcast data stream based upon a request to add the content referenced by the URL. Arrow 2014 directs execution from operation 2012 to operation 2016. Operation 2016 terminates the operation of this flowchart.

Arrow 2020 directs the flow of execution from starting operation 2001 to operation 2022. Operation 2022 performs the step of removing content referenced by the URL from the broadcast data stream based upon the request to remove the content referenced by the URL. Arrow 2024 directs execution from operation 2022 to operation 2016. Operation 2016 terminates the operation of this flowchart.

Figure 20A:
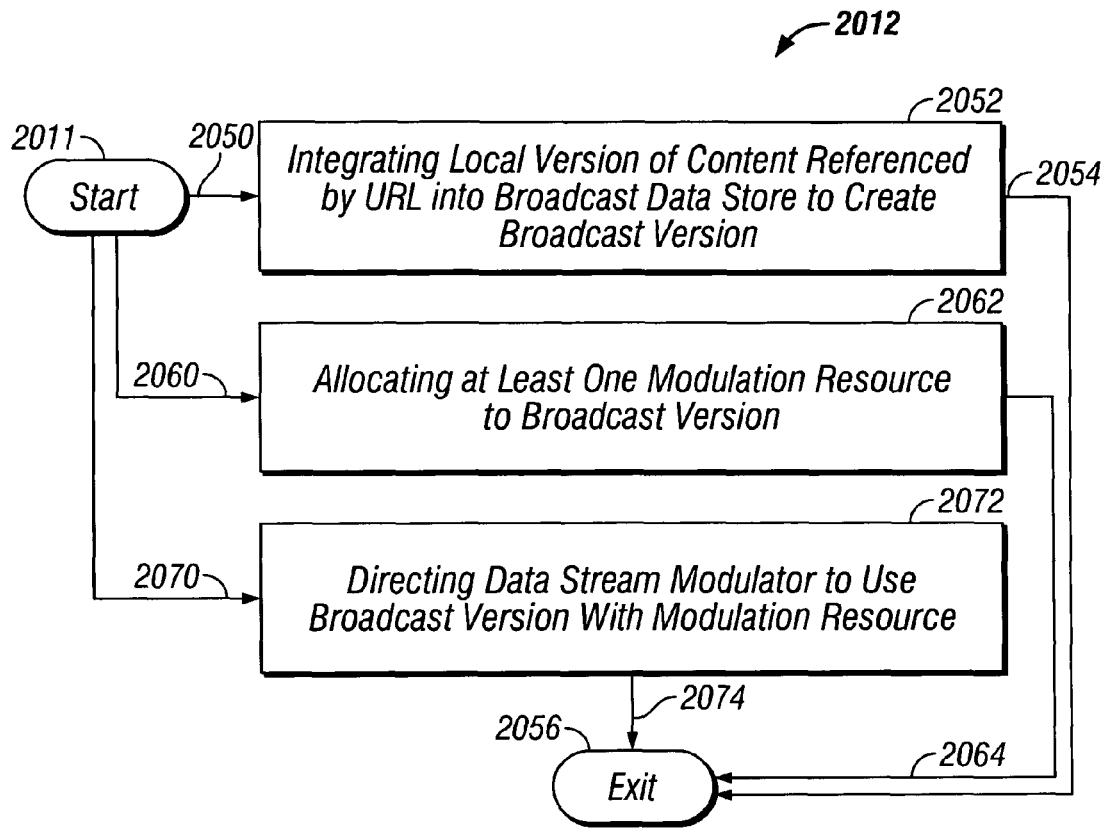
FIG. 20A is a detailed flowchart showing a mechanism for adding the content referenced by the URL according to the invention.

FIG. 20A is a detailed flowchart showing a mechanism for adding the content referenced by the URL 2012 (See FIG. 19B).

Arrow 2050 directs the flow of execution from starting operation 2011 to operation 2052. Operation 2052 performs the step of integrating a local version of the content referenced by the URL into a broadcast data store to create a broadcast version. Arrow 2054 directs execution from operation 2052 to operation 2056. Operation 2056 terminates the operation of this flowchart.

Arrow 2060 directs the flow of execution from starting operation 2011 to operation 2062. Operation 2062 performs the step of allocating at least one modulation resource to the broadcast version. Arrow 2064 directs execution from operation 2062 to operation 2056. Operation 2056 terminates the operation of this flowchart.

Arrow 2070 directs the flow of execution from starting operation 2011 to operation 2072. Operation 2072 performs the step of directing a data stream modulator to use the broadcast version with the modulation resource. Arrow 2074 directs execution from operation 2072 to operation 2056. Operation 2056 terminates the operation of this flowchart.

Figure 20B:
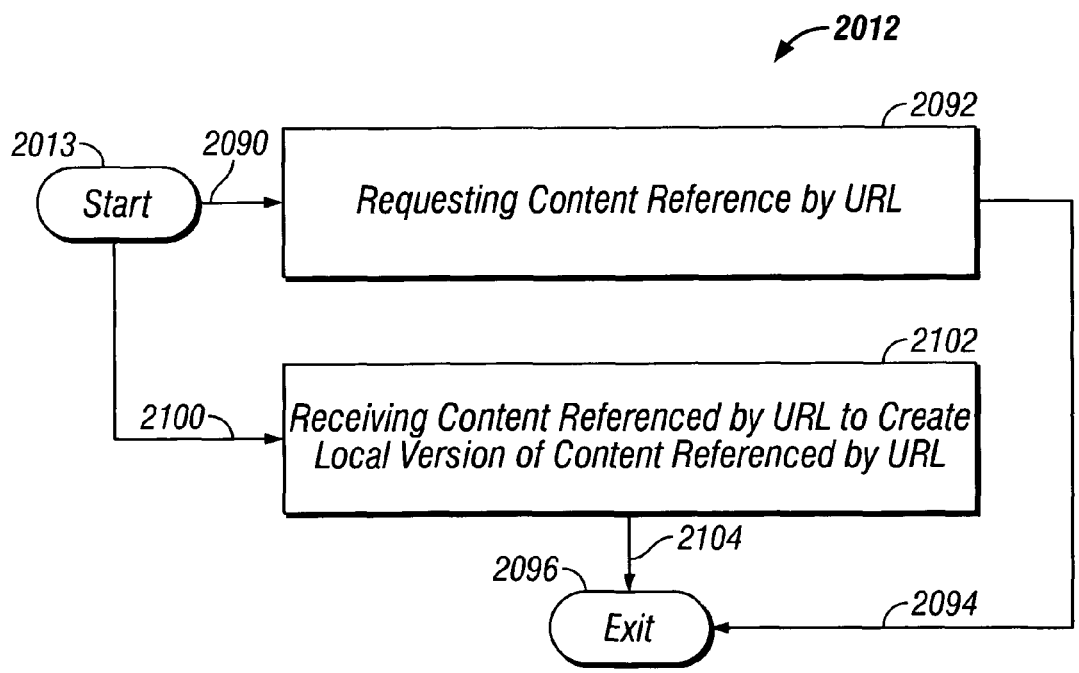
FIG. 20B is a detailed flowchart showing a mechanism for adding the content referenced by the URL according to the invention.

FIG. 20B is a detailed flowchart showing a mechanism for adding content referenced by the URL 2012 (See FIG. 19B).

Arrow 2090 directs the flow of execution from starting operation 2013 to operation 2092. Operation 2092 performs the step of requesting the content referenced by the URL.

Arrow 2094 directs execution from operation 2092 to operation 2096. Operation 2096 terminates the operation of this flowchart.

Arrow 2100 directs the flow of execution from starting operation 2013 to operation 2102. Operation 2102 performs the step of receiving the content referenced by the URL to create the local version of the content referenced by the URL. Arrow 2104 directs execution from operation 2102 to operation 2096. Operation 2096 terminates the operation of this flowchart.

Figure 21:
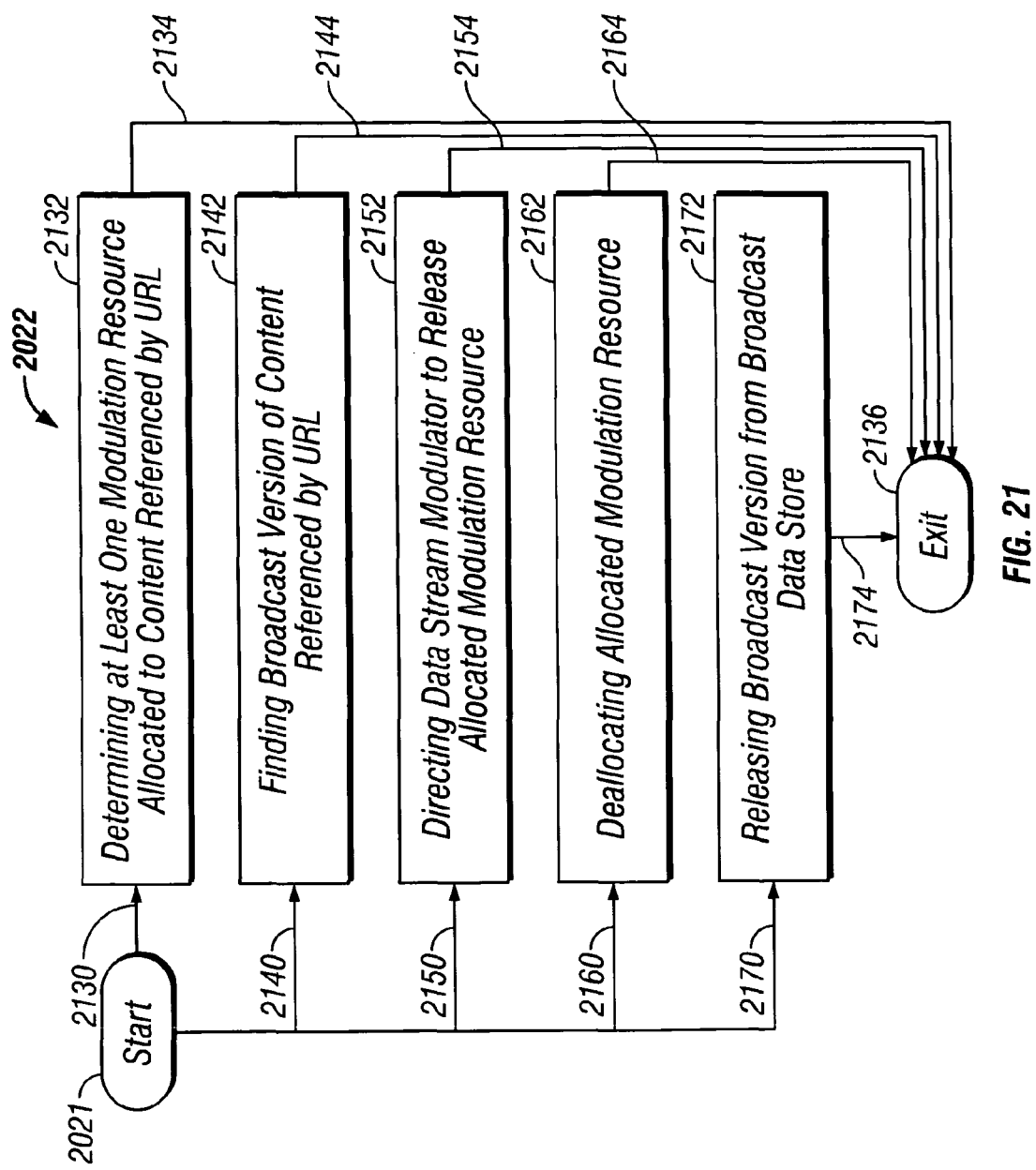
FIG. 21 is a detailed flowchart showing a mechanism for removing the content referenced by the URL according to the invention.

FIG. 21 is a detailed flowchart showing a mechanism for removing the content referenced by the URL 2022 (See FIG. 19B).

Arrow 2130 directs the flow of execution from starting operation 2021 to operation 2132. Operation 2132 performs the step of determining at least one modulation resource allocated to the content referenced by the URL. Arrow 2134 directs execution from operation 2132 to operation 2136. Operation 2136 terminates the operations of this flowchart.

Arrow 2140 directs the flow of execution from starting operation 2021 to operation 2142. Operation 2142 performs the step of finding a broadcast version of the content referenced by the URL. Arrow 2144 directs execution from operation 2142 to operation 2136. Operation 2136 terminates the operation of this flowchart.

Arrow 2150 directs the flow of execution from starting operation 2021 to operation 2152. Operation 2152 performs the step of directing a data stream modulator to release the allocated modulation resource. Arrow 2154 directs execution from operation 2152 to operation 2136. Operation 2136 terminates the operation of this flowchart.

Arrow 2160 directs the flow of execution from starting operation 2021 to operation 2162. Operation 2162 performs the step of deallocating the allocated modulation resource. Arrow 2164 directs execution from operation 2162 to operation 2136. Operation 2136 terminates the operation of this flowchart.

Arrow 2170 directs the flow of execution from starting operation 2021 to operation 2172. Operation 2172 performs the step of releasing the broadcast version from the broadcast data store. Arrow 2174 directs execution from operation 2172 to operation 2136. Operation 2136 terminates the operation of this flowchart.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method of transmitting a broadcast data stream to a plurality of client devices, said broadcast data stream including data representing a plurality of URLs, said method comprising:
   determining whether a number of requests from one or more of the client devices for a first URL of the plurality of URLs exceeds a threshold;
   adding a locally-stored version of content corresponding to said first URL to said broadcast data stream responsive to the number of said requests being determined to exceed said threshold,
   wherein determining whether the number of requests for the first URL exceeds the threshold comprises:
   determining at least one hit-count using a first node by a collection of at least two of the client devices within a first of a time-interval of said first URL to create a URL-hit-count within said first time-interval for said first URL; and
   estimating usage of said first URL based upon said URL-hit-count within said first time-interval for said first URL to create said usage estimate for said first URL,
   wherein said first node is configured to communicate with said members of said client collection, and
   wherein the method further comprises:
   sending said usage estimate for said first URL to a second node ogsa4d nodes-to create a node usage estimate from said first node at said second node; and
   integrating said node usage estimate to create an integrated usage estimate for said first URL.

2. The method of claim 1, further comprises: further comprising scheduling a web site with said first URL for data broadcast by included in said broadcast data stream based upon said node usage estimate from said node.

3. The method of claim 1, further comprising scheduling a web site with said first URL for data included in said broadcast data stream based upon said integrated usage estimate for said first URL.

4. A system, comprising:
   a computer comprising an interface with a network and configured to:
   receive from the network via the interface a first indication of a number of times that a universal resource locator (URL) is requested by a first plurality of client devices in the network,
   receive from the network via the interface a second indication of a number of times that the URL is requested by a second plurality of client devices in the network, and
   determine a value based upon the first and second indications; and
   a data transmission apparatus configured to:
   determine, based on the value, whether to add content to a broadcast data stream, and if so, adding the content to the data stream, and
   transmit the broadcast data stream including the added content to the first and second pluralities of client devices.

5. The system of claim 4, wherein the first indication represents a number of requests for the URL from only a portion of the first plurality of client devices, and wherein the data transmission apparatus is configured to transmit the broadcast data stream including the added content to all of the first plurality of client devices.

* * * * *

UNITED STATES PATENT AND TRADEMARK OFFICE
CERTIFICATE OF CORRECTION

| | |
|---|---|
| PATENT NO. | : 7,797,418 B2 |
| APPLICATION NO. | : 10/213487 |
| DATED | : September 14, 2010 |
| INVENTOR(S) | : Raymond Drewry et al. |

Page 1 of 1

It is certified that error appears in the above-identified patent and that said Letters Patent is hereby corrected as shown below:

In the Claims:

Column 14, Claim 2, Line 23:
    Please delete "further comprises:"

Column 14, Claim 2, Line 25:
    Please delete "broadcast by"

Signed and Sealed this
Twenty-first Day of January, 2014

Michelle K. Lee
*Deputy Director of the United States Patent and Trademark Office*